United States Patent
Shu et al.

(10) Patent No.: US 8,811,937 B2
(45) Date of Patent: Aug. 19, 2014

(54) REDIRECTION METHOD, REDIRECTION DEVICE, AND COMMUNICATION SYSTEM

(75) Inventors: Guiming Shu, Shenzhen (CN); Zhiming Ding, Shenzhen (CN); Yongli Yang, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 0 days.

(21) Appl. No.: 13/480,170

(22) Filed: May 24, 2012

(65) Prior Publication Data

US 2012/0231759 A1 Sep. 13, 2012

Related U.S. Application Data

(63) Continuation of application No. PCT/CN2010/079161, filed on Nov. 26, 2010.

(30) Foreign Application Priority Data

Nov. 27, 2009 (CN) .......................... 2009 1 0225894

(51) Int. Cl.
*H04M 11/04* (2006.01)
*H04W 48/14* (2009.01)
*H04W 48/18* (2009.01)
*H04W 88/08* (2009.01)

(52) U.S. Cl.
CPC .............. *H04W 48/14* (2013.01); *H04W 48/18* (2013.01); *H04W 88/08* (2013.01)
USPC ...... 455/404.1; 455/436; 370/328; 370/395.2

(58) Field of Classification Search
USPC ........ 455/436, 411, 435.1, 410, 432.1, 404.1; 370/328, 252, 338, 280, 395.2
See application file for complete search history.

(56) References Cited

U.S. PATENT DOCUMENTS 8,498,267 B2 * 7/2013 Choi-Grogan et al. ....... 370/331
2002/0107017 A1 8/2002 Song
(Continued)

FOREIGN PATENT DOCUMENTS

CN 1370031 A 9/2002
CN 1627849 A 6/2005
(Continued)

OTHER PUBLICATIONS

Xu B, (CN 1627849)—Method for starting switching by user's device in multi-mode based on new added service, Jun. 15, 2005, (English translation).*

(Continued)

*Primary Examiner* — Mahendra Patel
(74) *Attorney, Agent, or Firm* — Brinks Gilson & Lione

(57) ABSTRACT

A redirection method, a redirection device, and a communication system in the field of communication technology are provided. The redirection method includes the following steps: A femto access point (FAP) receives a message, in which the message contains information of a service required by a terminal. After the FAP determines that it does not support the service, the FAP acquires information of base stations supporting the service. The FAP sends the information of the base stations supporting the service to the terminal, so as to enable the terminal to determine a target base station according to the information of the base stations supporting the service. Therefore, the terminal is redirected to the target base station supporting the service required by the terminal, and efficiency of implementing the required service by the terminal is increased.

7 Claims, 10 Drawing Sheets

(56) References Cited

U.S. PATENT DOCUMENTS

| | | |
|---|---|---|
| 2003/0134640 A1 | 7/2003 | Kim et al. |
| 2006/0111111 A1* | 5/2006 | Ovadia .......................... 455/439 |
| 2007/0105527 A1 | 5/2007 | Nylander et al. |
| 2007/0177510 A1* | 8/2007 | Natarajan et al. ............. 370/238 |
| 2007/0183427 A1* | 8/2007 | Nylander et al. .......... 370/395.2 |
| 2008/0132239 A1* | 6/2008 | Khetawat et al. ............. 455/438 |
| 2008/0305792 A1* | 12/2008 | Khetawat et al. .......... 455/435.1 |
| 2009/0156213 A1* | 6/2009 | Spinelli et al. ................ 455/436 |
| 2009/0190545 A1* | 7/2009 | Kubota .......................... 370/329 |
| 2011/0070886 A1 | 3/2011 | Masuda et al. |

FOREIGN PATENT DOCUMENTS

| | | |
|---|---|---|
| CN | 1722860 A | 1/2006 |
| CN | 101500313 A | 8/2009 |
| JP | 2007-134841 | 5/2007 |
| JP | 2009-510969 A | 3/2009 |
| JP | 2009-182597 | 8/2009 |
| KR | 10-2009-0083877 | 8/2009 |
| RU | 2003126448 A | 1/2005 |
| WO | WO 2008020536 A1 | 2/2008 |
| WO | WO 2009104648 A1 | 8/2009 |
| WO | WO 2009148125 A1 | 12/2009 |

OTHER PUBLICATIONS

International Search Report issued in corresponding PCT Patent Application No. PCT/CN2010/079161, mailed Mar. 10, 2011.
Written Opinion of the International Searching Authority issued in corresponding PCT Patent Application No. PCT/CN2010/079161, mailed Mar. 10, 2011.
Office Action issued in corresponding Chinese Patent Application No. 200910225894.3, mailed Sep. 5, 2012.
"WiMAX Forum Network Architecture: Femtocells" NWG Release 1.6, Sep. 30, 2009.
Office Action issued in corresponding Chinese Patent Application No. 200910225894.3, mailed May 31, 2013, 20 pages.
Office Action issued in corresponding Japanese patent application No. 2012-540277, mailed Sep. 3, 2013, 4 pages.

* cited by examiner

US 8,811,937 B2

REDIRECTION METHOD, REDIRECTION DEVICE, AND COMMUNICATION SYSTEM

CROSS-REFERENCE TO RELATED APPLICATIONS

This application is a continuation of International Application No. PCT/CN2010/079161, filed on Nov. 26, 2010, which claims priority to Chinese Patent Application No. 200910225894.3, filed on Nov. 27, 2009, both of which are hereby incorporated by reference in their entireties.

FIELD OF THE INVENTION

The present invention relates to the field of communication technology, and more particularly to a redirection method, a redirection device, and a communication system.

BACKGROUND OF THE INVENTION

A good network coverage rate, especially a good indoor coverage rate, is one of the critical factors leading to the success of the 3rd Generation (3G) mobile communication technology. In the Worldwide Interoperability for Microwave Access (WiMAX) technology, a femto access point (FAP) may be deployed in, for example, a house, an office, or an office building of an enterprise of a user, and the FAP is connected to an operator network through an Internet Protocol (IP) broadband, thereby efficiently improving an indoor coverage rate of a network.

In order to ensure Emergency Service (ES) communication, currently in a solution adopted in WiMAX specification, a terminal ranging request (RNG-REQ) message is used for service indication. For example, ES indication information is added to the RNG-REQ message, so as to enable the FAP to provide an access service for a terminal requiring an ES. The support capability for the ES of the FAP may be controlled by a FAP management entity of the WiMAX, so that the WiMAX can inactivate or activate the support capability for the ES of the FAP.

The inventors find in the process of implementing the present invention that when a terminal initiates a service, for example, an ES request, to a FAP, the terminal is incapable of learning whether the FAP can provide the support capability for the service. If the FAP is incapable of providing the support capability for the service, the terminal needs to reselect a FAP. However, whether the reselected FAP can provide the support capability for the service is still uncertain, so that efficiency of implementing required services by the terminal is lowered.

SUMMARY OF THE INVENTION

The embodiments of the present invention provide a redirection method, a redirection device, and a communication system, so as to improve efficiency that a terminal implements required services.

An embodiment of the present invention provides a redirection method. The method includes the following steps:

A FAP receives a message, in which the message contains information of a service required by a terminal.

After the FAP determines that it does not support the service, the FAP acquires information of base stations (BSs) supporting the service.

The FAP sends the information of the base stations supporting the service to the terminal, so as to enable the terminal to determine a target base station according to the information of the base stations supporting the service.

An embodiment of the present invention further provides a FAP. The FAP includes a service information receiving module, a base station information acquisition module, and a base station information sending module.

The service information receiving module is configured to receive a message, in which the message contains information of a service required by a terminal.

The base station information acquisition module is configured to acquire information of base stations supporting the service when the FAP determines that it does not support the service.

The base station information sending module is configured to send the information of the base stations supporting the service to the terminal, so as to enable the terminal to determine a target base station according to the information of the base stations supporting the service.

An embodiment of the present invention further provides a terminal. The terminal includes a service information sending module, a base station information receiving module, and a base station determination module.

The service information sending module is configured to send a message to a FAP, in which the message contains information of a service required by the terminal.

The base station information receiving module is configured to receive information of base stations sent from the FAP, where the information of the base stations is acquired by the FAP when the FAP determines that it does not support the service, and the base stations supports the service.

The base station determination module is configured to determine a target base station according to the information of the base stations.

An embodiment of the present invention further provides a communication system. The communication system includes a FAP and a terminal in communication connection with the FAP.

The FAP is configured to receive a message, where the message contains information of a service required by the terminal; acquire information of base stations supporting the service when the FAP determines that it does not support the service; and send the information of the base stations supporting the service to the terminal, so as to enable the terminal to determine a target base station according to the information of the base stations supporting the service.

An embodiment of the present invention further provides a FAP management server. The server includes a receiving module, a query module, and a sending module.

The receiving module is configured to receive a request for querying information of base stations supporting a service sent from a FAP.

The query module is configured to query information of base station stored in the query module, and acquire information of adjacent base stations of the FAP sending the query request.

The sending module is configured to send the information of the adjacent base stations to the FAP sending the query request.

According to the present invention, when a FAP currently connected to a terminal does not support the service required by the terminal, the FAP acquires the information of base stations supporting the service required by the terminal, and sends the information of the base stations supporting the service to the terminal. Therefore, the terminal is redirected to the target base station supporting the service required by the terminal, and efficiency of implementing the required service by the terminal is increased.

An embodiment of the present invention further provides a redirection method, where the method includes:

sending, by a terminal, a message to a femto access point (FAP), where the message includes information of a service required by the terminal;

receiving, by the terminal, information of other base stations sent by the FAP, where the information of the other base stations is acquired by the FAP when the FAP determines that the FAP itself does not support the service; and determining, by the terminal, a target base station supporting the service according to the information of the other base stations, and sending the message to the target base station.

An embodiment of the present invention further provides a terminal, where the terminal includes:

a service information sending module, configured to send a message to a femto access point (FAP), where the message includes information of a service required by the terminal;

a base station information receiving module, configured to receive information of other base stations sent by the FAP, where the information of the other base stations is acquired by the FAP when FAP determines that the FAP itself does not support the service; and a base station determination module, configured to determine a target base station supporting the service according to the information of the other base stations.

An embodiment of the present invention further provides a communication system, where the communication system includes:

a femto access point (FAP) and a terminal in communication connection with the FAP, where the terminal is configured to: send a message to the FAP, where the message includes information of a service required by the terminal; receive information of other base stations sent by the FAP, where the information of the other base stations is acquired by the FAP when the FAP determines that the FAP itself does not support the service; and determine a target base station supporting the service according to the information of the other base stations, and send the message to the target base station.

In the embodiments of the present invention, when the FAP currently connected to the terminal does not support the service required by the terminal, the terminal acquires the information of the other base stations from the FAP. Therefore, the terminal is redirected to the target base station supporting the service required by the terminal, thereby increasing efficiency of implementing the required service by the terminal.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solution of the present invention is clearly and completely described in the following with reference to the accompanying drawings of the present invention. It is obvious that the embodiments to be described are only a part rather than all of the embodiments of the present invention. All other embodiments obtained by persons skilled in the art based on the embodiments of the present invention without creative efforts shall fall within the protection scope of the present invention.

Embodiment 1

Figure 1:
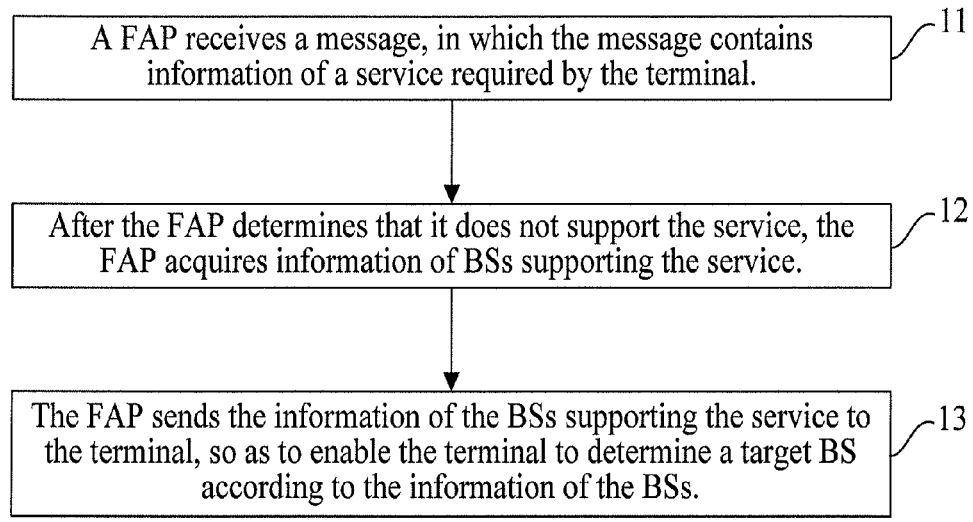
FIG. 1 is a flow chart of a redirection method according to Embodiment 1 of the present invention.

FIG. 1 is a flow chart of a redirection method according to Embodiment 1 of the present invention. In this embodiment, an implementation subject may be a femto base station (FAP, FAP, also called FAP) currently connected to a terminal. As shown in FIG. 1, the redirection method according to the embodiment includes the following steps:

In step 11, a FAP receives a message, in which the message contains information of a service required by the terminal.

If a terminal needs to access a network, a FAP may provide a network access service. When the terminal is connected to a certain FAP, the terminal sends a message to the FAP, in which the message contains information of a service required by the terminal. The information of the service required by the terminal may include, for example, indication information of an ES required by the terminal; a location update (LU) service, or a re-entry service required by the terminal.

In step 12, after the FAP determines that it does not support the service, the FAP acquires information of base stations supporting the service.

The FAP determines whether it supports the service according to the information of the service required by the terminal. If the FAP supports the service, the FAP provides a network access service of the service for the terminal; if the FAP does not support the service, the FAP acquires information of base stations supporting the service, so as to redirect the terminal to the base station supporting the service.

The base stations supporting the service may include a Macro Base Station (MBS) adjacent to the FAP and/or a FAP that supports the service and is adjacent to the FAR The mode of acquiring the information of the base stations supporting the service is not limited. For example, the FAP may acquire the information of the base stations supporting the service from a FAP management server. Alternatively, capability information of adjacent base stations may be pre-configured in the FAP in a network deployment process, and the information of the base stations supporting the service is determined according to the capability information of the adjacent base stations.

In step 13, the FAP sends the information of the base stations supporting the service to the terminal, so as to enable the terminal to determine a target base station according to the information of the base stations.

The FAP sends the information of the base stations supporting the service required by the terminal to the terminal. The terminal may determine the target base station based on the received information of the base stations according to a preset base station selection strategy, and send the message to the target base station, where the message contains the information of the service required by the terminal. The target base station provides the network access service for the terminal, so as to enable the terminal to implement the required service.

In this embodiment, when the FAP currently connected to the terminal does not support the service required by the terminal, the FAP acquires the information of the base stations supporting the service required by the terminal, and sends the information of the base stations to the terminal, so that the terminal can correctly select the target base station supporting the service required by the terminal. Therefore, the terminal is redirected to the target base station supporting the service required by the terminal, and efficiency of implementing the required service by the terminal is increased.

Embodiment 2

Figure 2:
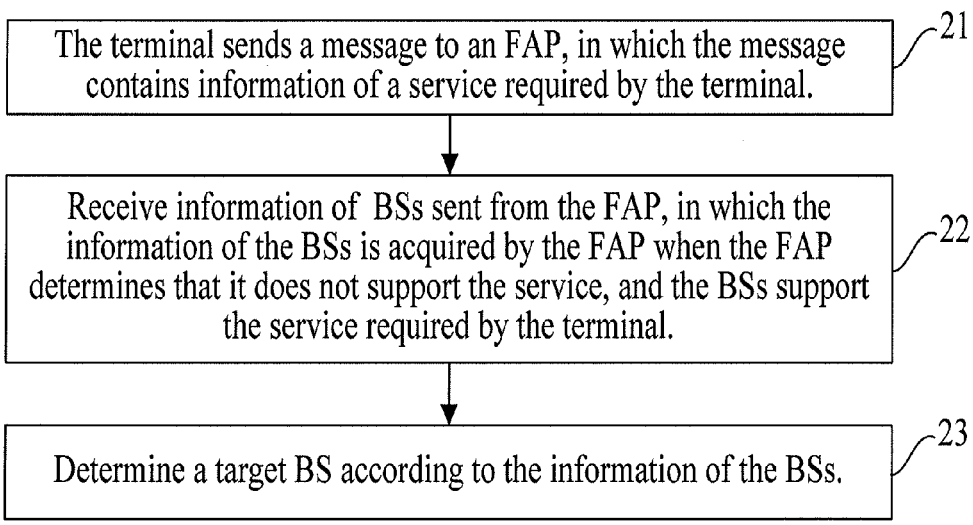
FIG. 2 is a flow chart of a redirection method according to Embodiment 2 of the present invention.

FIG. 2 is a flow chart of a redirection method according to Embodiment 2 of the present invention. In this embodiment, an implementation subject may be a terminal. As shown in FIG. 2, the redirection method according to the embodiment includes the following steps:

In step 21, the terminal sends a message to a FAP, where the message contains information of a service required by the terminal.

The terminal sends the information of the service required by the terminal to a FAP currently connected to the terminal for requesting the FAP to provide a network access service for the terminal. The information of the service required by the terminal may include, for example, indication information of an ES required by the terminal; or, indication information of a LU service or a re-entry service required by the terminal.

In step 22, receive information of base stations sent from the FAP, in which the information of the base stations is acquired when the FAP determines that it does not support the service and the base stations supports the service required by the terminal.

When receiving the information of the service required by the terminal, the FAP determines whether it supports the service. If the FAP supports the service, the FAP provides the network access service for the terminal; if the FAP does not support the service, the FAP acquires information of base stations supporting the service, and sends the information of the base stations to the terminal.

The information of the base stations received by the terminal may include identifiers of the base stations, or identifiers of the base stations and channel frequencies used by the base stations. The base stations may include an MBS adjacent to the FAP, and/or a FAP that supports the required service and is adjacent to the FAP.

In step 23, determine a target base station according to the information of the base stations.

The terminal may send the message to the target base station, in which the message contains the information of the service required by the terminal.

The terminal may determine the target base station based on the received information of the base stations according to a preset base station selection strategy. The base station selection strategy may be flexibly set according to practical demands. For example, the terminal may select a base station with the highest signal intensity as the target base station according to the signal strength. Alternatively, the terminal may select a base station with a channel frequency that is matched with a channel frequency supported by the terminal as the target base station.

After determining the target base station, the terminal sends the message to the target base station, in which the message contains the information of the service required by the terminal. The target base station provides the network access service for the terminal, so as to enable the terminal to implement the required service.

In this embodiment, when the FAP currently connected to the terminal does not support the service required by the terminal, the terminal may receive the information acquired by the FAP about the base stations supporting the service required by the terminal, so that the terminal can correctly select a target base station supporting the service required by the terminal. Therefore, blindness in selection of the target base station is reduced and accordingly, efficiency of implementing the required service by the terminal is improved.

Figure 3:
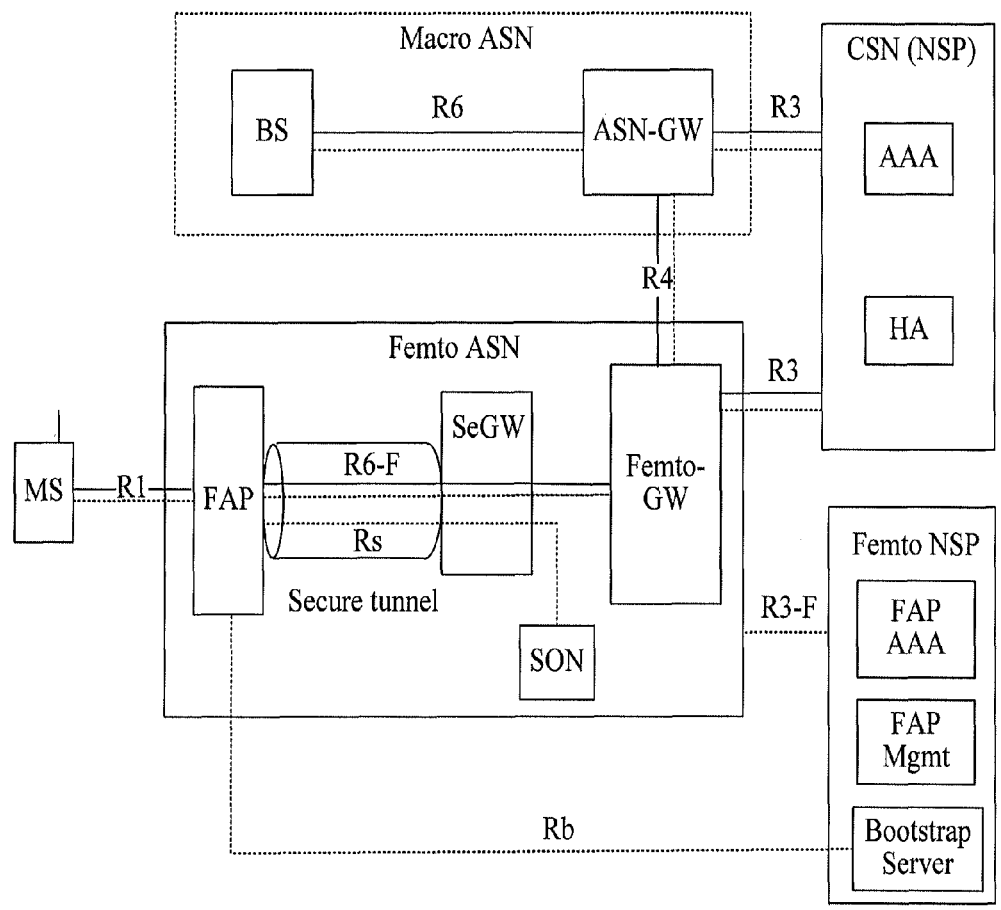
FIG. 3 is a schematic structural view of a WiMAX network in an application scenario according to an embodiment of the present invention.

FIG. 3 is a schematic structural view of a WiMAX network in an application scenario according to an embodiment of the present invention. As shown in FIG. 3, a femto access service network (Femto ASN) includes a FAP, a security gateway (SeGW), and a femto gateway (Femto-GW).

A mobile station (MS, which is also referred to as a mobile terminal) may be connected to the FAP, and provide information of a service required by an MS. The MS is one type of terminal.

The FAP provides a network access service for the MS.

The SeGW, as a functional entity for a security purpose, provides a secure tunnel for the FAP, and is responsible for authentication and authorization of the FAP.

The Femto-GW controls the FAP and is responsible for transfer of user data to a common services network (CSN).

A service range of a FAP is relatively smaller compared with that of an MBS, and is generally within a range of more than ten meters to several hundreds meters. The FAP may be deployed in a house, an office, or an office building of an enterprise of a user, and connected to an operator network through IP broadband. The FAP may include the following three types:

Open FAP: In an Open FAP, no subscriber group function is set, and a user is not controlled on the FAP.

Open Subscriber Group (OSG): In an OSG FAP, a subscriber group function can be set, but the FAP does not determine whether a visitor terminal belongs to an OSG thereof.

Close Subscriber Group (CSG): In a CSG FAP, a subscriber group function can be set, and the FAP needs to determine whether a visitor terminal belongs to a CSG thereof. If the terminal does not belong to the CSG thereof, the FAP refuses to provide an access service for the terminal. As for a non-ES, for example, usually a LU service or re-entry service, generally only a terminal belonging to a CSG can be connected to a network through the FAP.

As shown in FIG. 3, in the WiMAX network, a new commercial entity femto network service provider (Femto NSP) is introduced on the basis of a conventional commercial entity such as an NSP. The Femto NSP is responsible for operation, authentication, and management of the FAP. For example, a FAP management server (FAP Mgmt, also referred to as a FAP management functional entity) is responsible for management of the FAP. Information of the FAP and information of an MBS may be maintained on the FAP management server.

Embodiment 3

Figure 4:
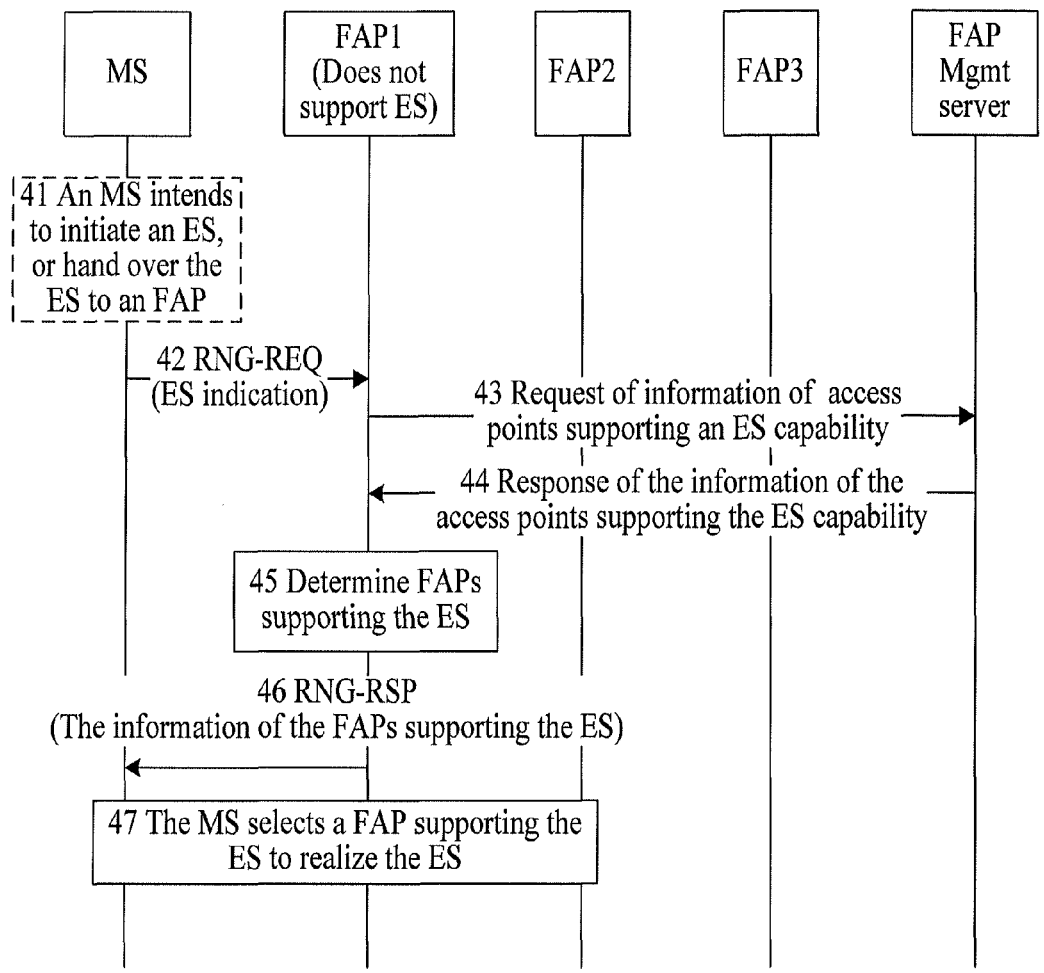
FIG. 4 is a signaling interaction diagram in a redirection method according to Embodiment 3 of the present invention.

FIG. 4 is a signaling interaction diagram in a redirection method according to Embodiment 3 of the present invention. In this embodiment, processing of an ES in the application scenario as shown in FIG. 3 is taken as an example. In this embodiment, it is assumed that a service required by an MS is an ES, a FAP currently connected to the MS is a FAP1, a FAP2 and a FAP3 are FAPs separately adjacent to the FAP1, and a FAP management server manages the FAPs and can activate or inactivate a support capability for the ES of the FAP. As shown in FIG. 4, the redirection method according to the embodiment includes the following steps:

In step 41, when the MS intends to initiate an ES, or the MS intends to hand over the ES from an original cell to a cell covered by a FAP, the MS selects a service FAP, for example, the FAP1. In this case, the MS does not know whether the FAP1 supports the ES.

If the MS intends to initiate an ES, for example, an emergency call service through a selected service FAP when being switched on and powered up, or the MS executing the ES needs to be handed over to a FAP, the MS selects a FAP according to a preset base station selection strategy, in which the selected FAP is the FAP1. In this case, the MS cannot determine whether the FAP1 supports the ES.

In step 42, the MS sends an RNG-REQ message to the FAP1, in which the RNG-REQ message carries ES indication information.

In step 43, the FAP1 sends a query request for information of access points supporting an ES capability to the FAP management server for querying information of the ES support capability of adjacent FAPs, in which the adjacent FAPs of the FAP1 are FAPs deployed in periphery of the FAP1.

The FAP1 receives the RNG-REQ message sent from the MS, and learns that the service required by the MS is the ES as the RNG-REQ message carries the ES indication information.

The FAP1 determines whether it supports the ES. If the FAP1 supports the ES, the FAP1 provides a network access service for the MS, and sends a ranging response (RNG-RSP) message to the MS, in which the RNG-RSP message carries indication information of accepting MS access.

If the FAP1 has no ES support capability, currently the FAP1 does not support the ES. Alternatively, although the FAP1 has ES support capability, if the ES support capability of the FAP1 is inactivated under the control of the FAP management server, the FAP1 also does not support the ES. After the FAP1 determines that it does not support the ES, the FAP1 needs to acquire information of base stations supporting the ES.

The FAP1 may send a query request for information of an access point supporting the ES capability to the FAP management server for querying information of the ES support capability of adjacent FAPs.

The FAP management server maintains information of FAPs. The information of the FAPs includes identifiers of the FAPs and information of the ES support capability of the FAPs. The information of the FAPs may further include one or more of channel frequencies, power, and locations of the FAPs, a list of terminal identifiers contained in a CSG, and identifiers of paging groups which the FAPs belong to.

Optionally, the FAP management server may further maintain the information of an MBS. In this case, the FAP1 may acquire information of an MBS adjacent to the FAP1 from the FAP management server. The situation is not shown.

In step 44, the FAP management server determines adjacent FAPs of the FAP1, and sends a response message of the information of the access points supporting the ES capability to the FAP1, in which the response message of the information of the access points supporting the ES capability carries information of the adjacent FAPs. The information of the adjacent FAPs includes identifiers of the FAPs and information of the ES support capability of the FAPs. Optionally, the information of the adjacent FAPs may further include information such as channel frequencies of the FAPs.

It is assumed in this embodiment that adjacent FAPs of the FAP1 include a FAP2 and a FAP3, and the FAP management server sends information of the FAP2 and the FAP3 to the FAP1. The information sent to the FAP1 by the FAP management server includes an identifier of the FAP2, information of an ES support capability of the FAP2, an identifier of the FAP3, and information of an ES support capability of the FAP3. Optionally, the information sent to the FAP1 by the FAP management server may further include information such as a channel frequency of the FAP2 and a channel frequency of the FAP3.

Optionally, if the FAP management server maintains information of an MBS, the FAP management server sends information of an MBS adjacent to the FAP1 to the FAP1.

In step 45, the FAP1 receives the response message of the information of the access points supporting the ES capability, acquires the information of the adjacent FAPs from the message, and determines base stations supporting the ES according to the information of the ES support capability of the adjacent FAPs. In this embodiment, the base stations supporting the ES that is determined by the FAP1 may include the FAP2 and/or the FAP3 supporting the ES, and/or the MBS (not shown) adjacent to the FAP1.

In step 46, the FAP1 sends an RNG-RSP message to the MS, in which the RNG-RSP message carries an identifier of the FAP2 and/or FAP3 supporting the ES. Optionally, the RNG-RSP message may further carry a channel frequency used by the FAP2 and/or the FAP3 supporting the ES.

Optionally, if the base stations supporting the ES that is determined by the FAP1 include the MBS adjacent to the FAP1, the FAP1 sends an identifier of the MBS to the MS. Optionally, the FAP1 may further send a channel frequency used by the MBS to the MS. Alternatively, the identifier of the MBS or the identifier of the MBS and the channel frequency used by the MBS may be carried in the RNG-RSP message and sent to the MS.

In step 47, the MS determines a target base station according to the received information of the base stations, and sends the ES indication information to the target base station. The target base station provides a network access service for the MS, so that the MS implements the ES through the target base station. FIG. 4 schematically shows only a situation in which the MS determines the FAP2 as the target base station.

The MS receives the information of the base stations sent from the FAP1, and determines a target base station by using a preset base station selection strategy.

It is assumed that both the FAP2 and FAP3 support the ES. The mode that the MS determines the target base station is not limited.

Information of a second FAP may include the identifiers of the FAP2 and FAP3. The MS may determine the target base station by using signal intensities of the FAPs. For example, if an intensity of a signal of the FAP2 received by the MS is greater than that of a signal of the FAP3 received by the MS, the MS may select the FAP2 as the target base station, initiate a redirection process to the FAP2, and provide a network access service for the MS through the FAP2, so as to realize the ES.

Alternatively, the information of the second FAP may include the identifier of the FAP2, the identifier of the FAP3, the channel frequency used by the FAP2, and the channel frequency used by the FAP3. The MS may determine the target base station by using the channel frequency used by the FAP. For example, the MS compares its own frequency with the channel frequencies used by the FAP2 and the FAP3 separately, and determines a FAP having a channel frequency matching with the frequency used by the MS. It is assumed that the channel frequency used by the FAP2 includes the frequency used by the MS, so the channel frequency used by the FAP2 matches with the frequency used by the MS, and the MS selects the FAP2 as the target base station.

The above is only an example of a mode that the MS determines the target base station in this embodiment, and the MS may also determine the target base station by using other modes according to practical demands. For example, the target base station is determined by considering the signal intensity and the work frequency of the FAP in combination.

In this embodiment, when the FAP currently connected to the MS does not support the ES, the FAP acquires the information of the adjacent base stations from the FAP management server, determines the information of base stations supporting the ES from the acquired adjacent base stations, sends the information of the base stations supporting the ES to the MS, and guides the MS to the base stations supporting the ES, thereby decreasing the blindness in selection of the target base station by the MS and increasing the efficiency of the MS to implement the ES.

Furthermore, depending on different modes that the FAP1 acquires information of the base stations supporting the ES, a part of the technical characteristics of the above technical solution according to the embodiment may be replaced to obtain some variations of the embodiment of the present invention, and details may be referred to descriptions in Embodiment 4, Embodiment 5, and Embodiment 6.

Embodiment 4

As another embodiment of the redirection method of the present invention, this embodiment is different from Embodiment 3 in the following:

In step 43, a FAP1 sends a message of querying information of adjacent FAPs supporting an ES to a FAP management server.

In step 44, the FAP management server determines the adjacent FAPs supporting the ES, and sends the information of the adjacent FAPs supporting the ES to a FAP1, but information of adjacent FAPs that does not support the ES is not sent to the FAP1.

In this case, the FAP1 need not to determine the FAP supporting the ES with the received information of the adjacent FAPs. That is, step 46 is directly performed without step 45. Other processing processes are similar to those in Embodiment 3, and therefore are not described here again.

In this embodiment, when a FAP currently connected to an MS does not support an ES, the FAP acquires information of other FAPs supporting the ES from a FAP management server, and sends the information of the FAPs supporting the ES to the MS, so as to guide the MS to the FAPs supporting the ES, so that the MS can correctly select a target base station supporting the ES. Therefore, the blindness in selection of the target base station in a redirection process is reduced and accordingly, the efficiency of implementing the ES by the MS is increased.

Embodiment 5

As another embodiment of the redirection method of the present invention, this embodiment is different from Embodiment 3 in the following. In this embodiment, in a deployment process of a WiMAX FAP, information of FAPs adjacent to the FAP to be deployed may be pre-configured on the FAP, in which the information of the FAPs include an identifiers of the FAPs, and information of an ES support capability of the FAPs. The information of the FAPs may further include one or more of channel frequencies, power, and locations of the FAPs, lists of terminal identifiers contained in a CSG, and identifiers of paging groups which the FAPs belong to.

In this embodiment, steps 43 and 44 do not need to be performed, and step 45 is specifically that a FAP1 determines adjacent FAPs supporting the ES according to the pre-configured information of the adjacent FAPs. Other processing processes are similar to those in Embodiment 3 and therefore are not described here again.

In this embodiment, if the ES support capability of the adjacent FAPs is changed, for example, in a case that a FAP3 supports the ES during network deployment, but in a subsequent application process, a FAP management server inactivates the ES support capability of the FAP3, causing that the ES support capability of the FAP3 is changed, the FAP1 may update the pre-configured information of the adjacent FAPs. The modes of updating the information of the adjacent FAPs are not limited. For example, a network administrator may manually update the information of the adjacent FAPs on the FAP1. Alternatively, the FAP with the ES support capability being changed may actively notify the adjacent FAPs, so that the adjacent FAPs can update information configured on the adjacent FAPs.

In this embodiment, when a FAP currently connected to an MS does not support an ES, the FAP determines information of other FAPs supporting the ES according to the pre-configured information of the adjacent FAPs, sends the information of the FAPs supporting the ES to the MS, and guides the MS to the FAPs supporting the ES, so that the MS can correctly select a target base station supporting the ES. Therefore, the blindness in selection of the target base station in a redirection process is reduced and accordingly, the efficiency of implementing the ES by the MS is increased.

Embodiment 6

As another embodiment of the redirection method of the present invention, this embodiment is different from Embodiment 3 in that in this embodiment, a FAP1 may further acquire information of an MBS adjacent to the FAP1. In this case, the following is included:

In step 46, an REQ-RSP message sent to an MS further carries the acquired information of the MBS. Other processing processes are similar to those in Embodiment 3, and therefore are not described here again.

The mode that the FAP1 acquires the information of the MBS is not limited, and may include, for example, the following.

The FAP1 may acquire information of MBS deployed in periphery of the FAP1 through actively scanning, and specifically the following steps are included. The FAP1 broadcasts a scan request. An MBS that receives the scan request feeds back a scan response to the FAP1. The FAP1 acquires information of the corresponding MBS according to the scan response.

Alternatively, the FAP1 may determine the MBS deployed in periphery of the FAP1 through a cell broadcast message received by the FAP1. If the FAP1 is in the coverage of the MBS, the FAP can receive the cell broadcast message sent by the MBS, thereby acquiring information of the corresponding MBS.

Alternatively, a FAP management server maintains the information of the MBS, so that the FAP management server can send the information of the MBS adjacent to the FAP1 to the FAP1.

In this embodiment, when a FAP currently connected to an MS does not support an ES, the FAP may acquire information of an MBS deployed in periphery of the FAP, sends the acquired information of the MBS to the MS, and guides the MS to the MBS, so that the MS can correctly select a target base station supporting the ES. Therefore, the blindness in selection of the target base station in a redirection process is reduced, and accordingly, the efficiency of implementing the ES by the MS is increased.

Embodiment 7

Figure 5:
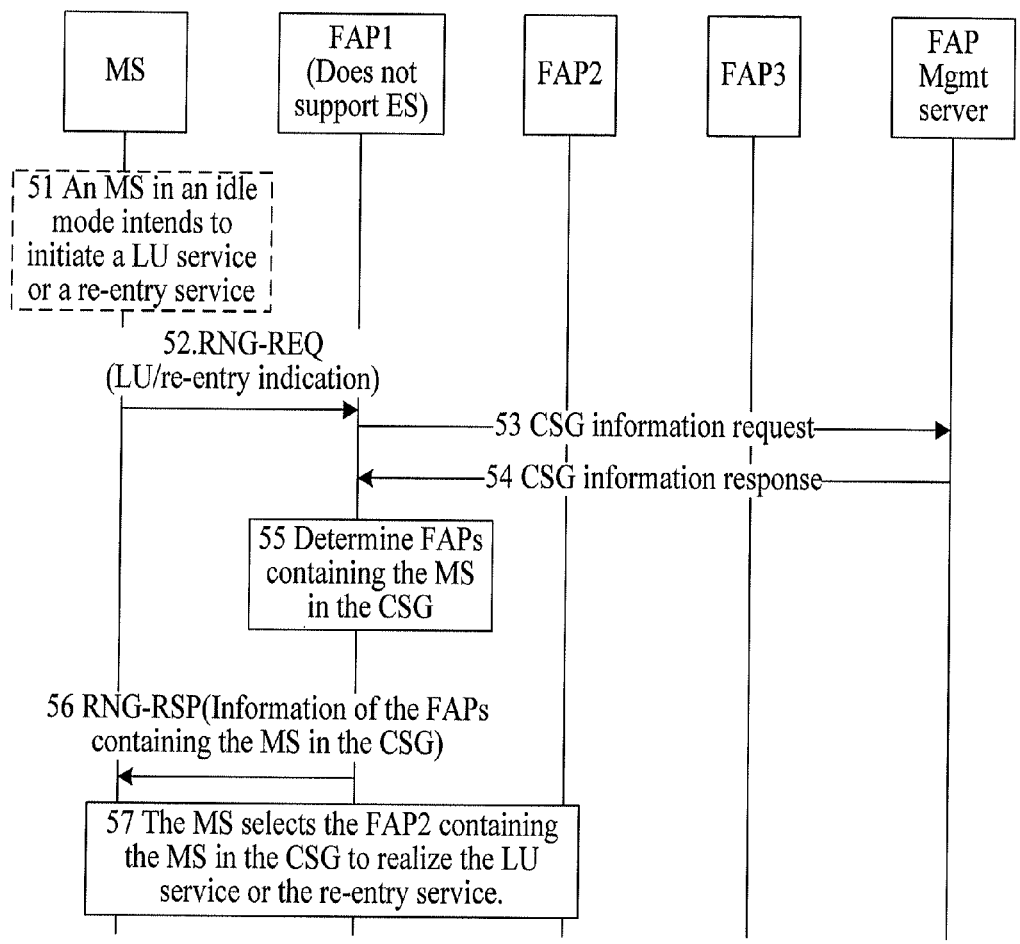
FIG. 5 is a signaling interaction diagram in a redirection method according to Embodiment 7 of the present invention.

FIG. 5 is a signaling interaction diagram in a redirection method according to Embodiment 7 of the present invention. In this embodiment, a processing process of a non-ES initiated by a terminal in idle mode in the application scenario as shown in FIG. 3 is taken as an example.

In this embodiment, it is assumed that an MS is in idle mode, and a service required by the MS is a LU service or a re-entry service, in which both the LU service and the re-entry service are non-ESes. A FAP currently connected to the MS is a FAP1 of a CSG type, a FAP2 and a FAP3 are FAPs separately adjacent to the FAP1, and a FAP management server manages the FAP and maintains information of the FAP. As shown in FIG. 5, the redirection method according to this embodiment includes the following steps:

In step 51, when the MS is in idle mode and needs to initiate a LU service or a re-entry service, the MS selects a service FAP, for example, a FAP1. In this case, the MS does not know whether it belongs to a subscriber group of the FAP.

The idle mode is a power saving mode provided for a terminal in a WiMAX specification. A terminal in the power saving mode needs to regularly receive information from a base station, and needs to update its own location information on a paging controller when the terminal finds that a paging group of an area in which the terminal is located is changed, that is, initiate a LU service. Alternatively, the terminal needs to select an access point to exit the idle mode when finding data transmission, that is, initiate a re-entry service.

A CSG FAP can increase a control function for a user, in which the function may be achieved by managing CSG information on the CSG FAP. As for a non-ES, for example, a LU service or a re-entry service, generally only a terminal belonging to a CSG can be connected to a network through the FAP. Therefore, the CSG FAP needs to determine whether a visitor terminal belongs to its own subscriber group, thereby determining whether to provide a network access service for the visitor terminal.

However, as for an Open FAP and an OSG FAP, generally, the network access service can be provided to all visitor terminals.

In this embodiment, when the MS in idle mode initiates a non-ES, for example, a LU service or a re-entry service, the MS does not know whether it belongs to a subscriber group of a FAP of an area in which the MS is located, so the MS may select a FAP that the MS does not belong to a subscriber group of the FAP, and initiate the LU service or the re-entry service to the selected FAP.

In step 52, the MS sends an RNG-REQ message to the FAP1, in which the RNG-REQ message carries indication information of the non-ES and identifier information of the MS. The identifier information of the MS includes information such as an equipment identifier and a media access control (MAC) address of the MS.

If the non-ES initiated by the MS is a LU service, the indication information of the non-ES is indication information of the LU. If the non-ES initiated by the MS is a re-entry service, the indication information of the non-ES is indication information of exiting the idle mode.

In step 53, the FAP1 sends a CSG information request message to the FAP management server for requesting to query CSG information of adjacent FAPs, in which the adjacent FAPs of the FAP1 is FAPs deployed in periphery of the FAP1.

The FAP1 receives the RNG-REQ message sent from the MS, and learns that the service required by the MS is a non-ES, for example, a LU service or a re-entry service, as the RNG-REQ message carries the indication information of the non-ES.

It is assumed in this embodiment that the FAP1 is a CSG FAP. The FAP1 determines whether the MS belongs to a subscriber group of the FAP1 according to the identifier information of the MS. For example, the FAP1 determines whether the identifier information of the MS such as the equipment identifier or MAC address of the MS is in a list of terminal information of the subscriber group. If yes, the MS belongs to the subscriber group of the FAP1; otherwise, the MS does not belong to the subscriber group of the FAP1.

If the MS belongs to the subscriber group of the FAP1, the FAP1 provides a network access service for the MS, and sends an RNG-RSP message to the MS, in which the RNG-RSP message carries indication information of accepting MS access.

If the MS does not belong to the subscriber group of the FAP1, the FAP1 refuses to provide the network access service for the terminal, and acquires information of base stations capable of providing the network access service for the MS.

The FAP management server maintains information of FAPs. The information of the FAPs includes identifiers of the FAPs. The FAPs may include an Open FAP, an OSG FAP, and a CSG FAP. As for the CSG FAP, the FAP management server further maintains CSG information of the CSG FAP, and the CSG information may be a list of terminal identifiers contained in a CSG. The information of the FAPs may further includes one or more of channel frequencies, power, and locations of the FAPs, information of an ES support capability of the FAPs, and identifiers of paging groups which the FAPs belong to.

Optionally, the FAP management server may further maintains information of an MBS. In this case, the FAP1 may acquire information of an MBS adjacent to the FAP1 from the FAP management server, as shown in FIG. 5.

In step 54, the FAP management server determines the adjacent FAPs of the FAP1, and sends an MS CSG information response message to the FAP1, in which the MS CSG information response message carries the information of the adjacent FAPs. The information of the adjacent FAPs includes identifiers of the FAPs, and may further includes CSG information of the OSG FAP if the FAP is the CSG FAP, in which the CSG information may be a list of terminal identifiers contained in a CSG. Optionally, the information of the adjacent FAPs may further include information such as channel frequencies used by the FAPs.

It is assumed in this embodiment that the adjacent FAP of the FAP1 includes the FAP2 and the FAP3, the FAP management server sends the information of the FAP2 and the FAP3 to the FAP1. The information sent to the FAP1 by the FAP management server includes an identifier of the FAP2 and an identifier of the FAP3. If both the FAP2 and the FAP3 are CSG FAPs, the information sent to the FAP1 by the FAP management server further includes CSG information of the FAP2 and CSG information of the FAP3. Optionally, the information sent to the FAP1 by the FAP management server may further includes, for example, a channel frequency of the FAP2 and a channel frequency of the FAP3.

Optionally, if the FAP management server maintains information of an MBS, the FAP management server sends information of an MBS adjacent to the FAP1 to the FAP1.

It is assumed in this embodiment that both the FAP2 and the FAP3 are CSG FAPs.

In step 55, the FAP1 receives the MS CSG information response message, acquires the information of the adjacent FAPs from the message, and determines FAPs including MS identifier information in the CSG information according to the CSG information of the adjacent FAPs. These FAPs support the LU service or the re-entry service of the MS. Among the adjacent FAPs of the FAP1, the FAP supporting the non-ES of the MS is a third FAP according to the embodiment of the present invention.

In this embodiment, the FAP2 and/or FAP3 supporting the non-ES of the MS, for example, the LU service or the re-entry service of the MS, is the third FAP.

Optionally, if the information of the base stations acquired by the FAP1 from the FAP management server further includes the information of the MBS adjacent to the FAP1, the Open FAPs adjacent to the FAP1, and/or the OSG FAPs adjacent to the FAP1, these base stations also support the LU service or the re-entry service of the MS, that is, these base stations also fall into the scope of the third FAPs according to the embodiment of the present invention, and the FAP1 sends the information of the base stations to the MS.

In step 56, the FAP1 sends an RNG-RSP message to the MS, in which the RNG-RSP message carries the information of the third FAPs, for example, an identifier of the FAP2 and/or the FAP3 supporting the LU service or the re-entry service of the MS. Optionally, the RNG-RSP message may further carry a channel frequency used by the FAP2 and/or the FAP3 supporting the LU service or the re-entry service of the MS.

In step 57, the MS determines a target base station according to the information of the third FAPs, and sends the indication information of the LU service or the re-entry service to the target base station. The target base station provides a network access service for the MS, so that the MS may realize the LU service or the re-entry service through the target base station.

The MS receives the information of the third FAPs sent by the FAP1, and determines a target base station from the third FAPs by using a preset base station selection strategy. The mode that the MS determines the target base station is not limited, details of which may be referred to the description in step 47 in Embodiment 3 and therefore are not described here again.

In this embodiment, when the MS does not belong to the subscriber group of the currently connected FAP, the FAP acquires the information of the adjacent base stations from the FAP management server, determines the base stations supporting the LU service or the re-entry service of the terminal from the acquired adjacent base stations, sends the information of the determined base stations to the MS, and guides the MS to the base stations supporting the LU service or the re-entry service of the terminal, so as to reduce the blindness in selection of the target base station from the base stations, thereby increasing the efficiency of implementing the LU service or the re-entry service by the MS in idle mode.

In addition, depending on different modes that the FAP1 acquires the base stations supporting the non-ES, a part of the technical characteristics of the above technical solution according to this embodiment may be replaced to obtain some variations of the embodiment of the present invention, and details may be referred to description in Embodiment 8, Embodiment 9, and Embodiment 10.

Embodiment 8

As another embodiment of the redirection method of the present invention, this embodiment is different from Embodiment 7 in the following.

In step 53, specifically, a FAP1 sends a message of querying information of adjacent FAPs supporting a non-ES of an MS to a FAP management server, for example, the FAP1 sends identifier information of the MS to the FAP management server, for requesting to query information of adjacent FAPs containing the identifier information of the MS in CSG information.

In step 54, specifically, the FAP management server determines the adjacent FAPs supporting the non-ES of the MS, and sends information of Open FAPs, OSG FAPs, and CSG FAPs containing the identifier of the MS in a CSG among the adjacent FAPs to the FAP1. However, the CSG FAP that the CSG information does not contain the MS identifier information is not sent to the FAP1.

Optionally, if the FAP management server maintains information of an MBS, the FAP management server may send information of an MBS adjacent to the FAP1 to the FAP1.

In this case, the FAP1 does not need to determine the FAPs supporting the non-ES of the MS according to the received information of the adjacent base stations, that is, step 56 is directly performed without step 55. Other processing processes are similar to those in Embodiment 7, and therefore are not described here again.

In this embodiment, when the MS does not belong to a subscriber group of a currently connected FAP, the FAP acquires information of base stations adjacent to the FAP and supporting a LU service or a re-entry service from the FAP management server, sends the acquired information of the base stations to the MS, and guides the MS to the base stations supporting the LU service or the re-entry service of the terminal, so that the blindness in selection of a target base station by the MS is reduced, thereby improving efficiency of implementing the LU service or the re-entry service by the MS in idle mode.

Embodiment 9

As another embodiment of the redirection method of the present invention, this embodiment is different from Embodiment 7 in the following. In this embodiment, in a deployment process of a WiMAX FAP, information of FAPs adjacent to the FAP to be deployed may be pre-configured on the FAP. The information of the adjacent FAPs includes types of the FAPs and identifiers of the FAPs, and may further include CSG information of the CSG FAP if the FAP is a CSG FAP, in which the CSG information may be a list of terminal identifiers contained in a CSG. The information of the FAPs may further include, for example, one or more of channel frequencies, power, and locations of the FAPs, information of an ES support capability of the FAPs, and identifiers of paging groups which the FAPs belong to.

In this embodiment, a FAP1 does not need to query information of base stations supporting a non-ES of an MS from a FAP management server, that is, steps 53 and 54 do not need to be performed, and step 55 is specifically that the FAP1 determines base stations supporting a LU service or a re-entry service of the MS according to the pre-configured information of the adjacent base stations. Other processing processes are similar to those in Embodiment 7 and therefore are not described here again.

In this embodiment, if the CSG of a CSG FAP among the adjacent FAPs is changed, the FAP1 may update the information of the adjacent FAP deployed in advance. The mode of updating the information of the CSG FAP is not limited. For example, a network administrator manually updates the information of the CSG FAP on the FAP1. Alternatively, the FAP with the CSG being changed may actively notify the adjacent FAP, so that the adjacent FAP can update information configured on the adjacent FAP.

In this embodiment, when the MS does not belong to a subscriber group of a currently connected FAP, the FAP determines the base stations supporting the LU service or the re-entry service of the MS according to the pre-configured information of the adjacent base stations, sends the information of the base stations to the MS, and guides the MS to a target base station supporting the LU service or the re-entry service of the terminal, so that the blindness in selection of the target base station by the MS is reduced, thereby increasing efficiency of implementing the LU service or the Re-entry service by the MS in idle mode.

Embodiment 10

As another embodiment of the redirection method of the present invention, this embodiment is different from Embodiment 7 in that in this embodiment, a FAP1 acquires information of an MBS adjacent to the FAP1. In this case, in step 56, an REQ-RSP message sent to an MS further carries acquired information of an MBS. Other processing processes are similar to those in Embodiment 7, and therefore are not described here again.

The mode of acquiring the information of the MBS by the FAP1 is not limited, details of which may be referred to the corresponding description in the sixth embodiment 6 and are described here again.

In this embodiment, when the MS does not belong to a subscriber group of a currently connected FAP, the FAP may acquire information of MBS deployed in periphery of the FAP, and send the acquired information of the MBS to the MS, guides the MS to the MBS, thereby increasing the efficiency of implementing the LU service or the re-entry service by the MS in idle mode.

Embodiment 11

Figure 6:
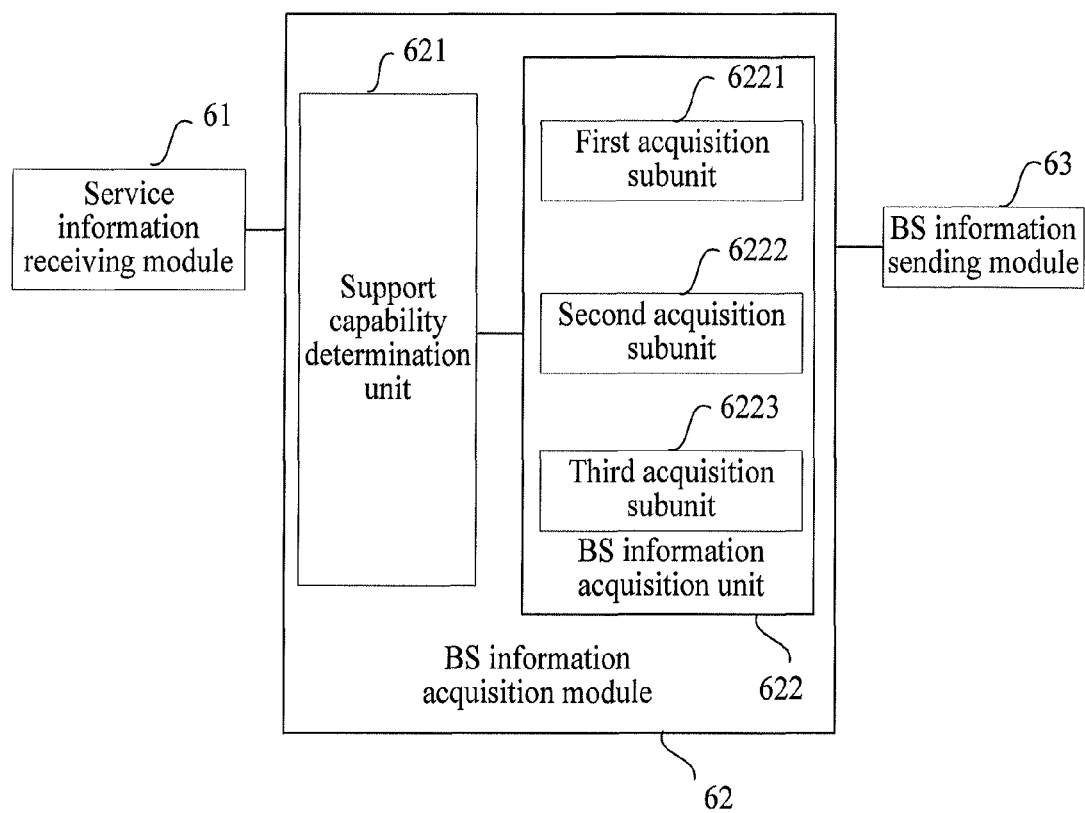
FIG. 6 is a schematic structural view of a FAP according to Embodiment 11 of the present invention.

FIG. 6 is a schematic structural view of a FAP according to Embodiment 11 of the present invention. As shown in FIG. 6, in this embodiment, the FAP includes a service information receiving module 61, a base station information acquisition module 62, and a base station information sending module 63.

The service information receiving module 61 is configured to receive a message, in which the message contains information of a service required by a terminal.

The base station information acquisition module 62 is configured to acquire information of base stations supporting the service required by the terminal when the FAP determines that it does not support the service required by the terminal.

The base station information sending module 63 is configured to send the information of the base stations supporting the service to the terminal, so as to enable the terminal to determine a target base station according to the information of the base station supporting the service. Optionally, the base station information sending module 63 is specifically configured to send identifiers of the base stations to the terminal, or send the identifiers of the base stations and channel frequencies of the base stations to the terminal.

On the basis of the above technical solution, the base station information acquisition module 62 may include a support capability determination unit 621 and a base station information acquisition unit 622. Depending on the different modes of acquiring the information of the base station, optionally, the base station information acquisition unit 622 may include at least one of a first acquisition subunit 6221, a second acquisition subunit 6222, and a third acquisition subunit 6223.

Optionally, a case in which the service required by the terminal is an ES is as follows:

The service information receiving module 61 is specifically configured to receive the message, in which the message contains information of the ES required by the terminal.

The support capability determination unit 621 is configured to determine that the FAP does not support the ES when the FAP has no ES support capability or the ES support capability of the FAP is inactivated.

The base station information acquisition unit 622 is configured to acquire the information of base stations supporting the ES when the support capability determination unit determines that the FAP does not support the ES.

Depending on the different modes of acquiring the information of the base stations, optionally, the first acquisition subunit 6221 is configured to acquire the information of the base stations supporting the ES from a FAP management server. The second acquisition subunit 6222 is configured to acquire the information of base stations from the FAP management server, and determine the information of the base stations supporting the ES from the acquired information of base stations. The third acquisition subunit 6223 is configured to determine the information of the base stations supporting the ES according to locally pre-configured information of the adjacent base stations.

The base stations supporting the ES includes an MBS adjacent to the FAP, and/or a FAP supporting the ES and adjacent to the FAP.

Alternatively, on the basis of the above technical solution, optionally, a case when the service required by the terminal is a LU service or a re-entry service is as follows.

The service information receiving module 61 is specifically configured to receive the message, in which the message contains information of the LU service or the re-entry service required by the terminal.

Correspondingly, the support capability determination unit 621 is configured to determine that the FAP does not support the LU service or the re-entry service of the terminal when the terminal does not belong to a pre-configured subscriber group of the FAP. The base station information acquisition unit 622 is configured to acquire the information of the base stations supporting the LU service or the re-entry service of the terminal when the support capability determination unit determines that the FAP does not support the LU service or the re-entry service of the terminal.

Depending on the different modes of acquiring the information of the base stations, optionally, the first acquisition subunit 6221 is configured to acquire the information of the base stations supporting the LU service or the re-entry service of the terminal from the FAP management server. The second acquisition subunit 6222 is configured to acquire the information of base stations from the FAP management server, and determine the information of the base stations supporting the LU service or the re-entry service of the terminal from the acquired information of the base stations. The third acquisition subunit 6223 is configured to determine the information of the base stations supporting the LU service or the re-entry service of the terminal according to locally pre-configured information of the adjacent base stations.

Optionally, the base stations supporting the LU service or the re-entry service of the terminal may include at least one of an MBS adjacent to the FAP, an Open FAP adjacent to the FAP, an OSG FAP adjacent to the FAP, and a CSG FAP adjacent to the FAP and including the terminal in a subscriber group.

In this embodiment, when a FAP currently connected to the terminal does not support the service required by the terminal, the FAP acquires the information of the base stations supporting the service required by the terminal, and sends the information of the base stations to the terminal, so that the terminal can correctly select the target base station supporting the service required by the terminal, thereby redirecting the terminal to the target base station supporting the service required by the terminal, and increasing the efficiency of implementing the required service by the terminal. In this embodiment, the work mechanism of the FAP may be referred to the description in the embodiments corresponding to FIGS. 1, 4, and 5, and is not described here again.

Embodiment 12

Figure 7:
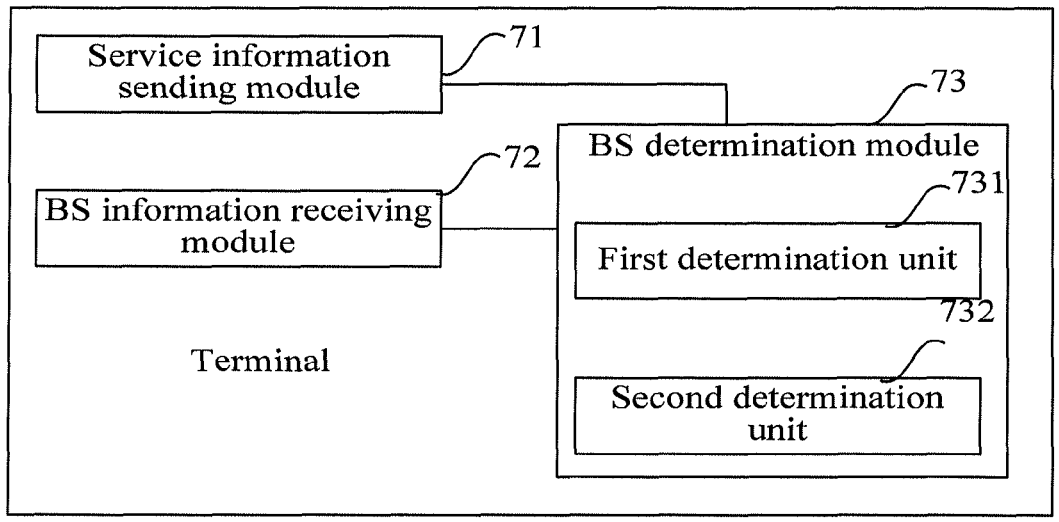
FIG. 7 is a schematic structural view of a terminal according to Embodiment 12 of the present invention.

FIG. 7 is a schematic structural view of a terminal according to Embodiment 12 of the present invention. As shown in FIG. 7, in this embodiment, the terminal includes a service information sending module 71, a base station information receiving module 72, and a base station determination module 73.

The service information sending module 71 is configured to send a message to a FAP, in which the message contains information of a service required by a terminal.

The base station information receiving module 72 is configured to receive information of base stations supporting the service sent from the FAP, in which the information of the base stations supporting the service is acquired by the FAP when the FAP determines that it does not support the service.

The base station determination module 73 is configured to determine a target base station according to the information of the base stations supporting the service.

In the above technical solution, optionally, the service required by the terminal may include an ES, a LU service or a re-entry service.

On the basis of the above technical solution, optionally, the base station determination module 73 includes a first determination unit 731 or a second determination unit 732.

The base station information receiving module 72 is specifically configured to receive identifiers of the base stations. Correspondingly, the first determination unit 731 is configured to determine the target base station according to signal intensities of the base stations corresponding to the identifiers.

Alternatively, the base station information receiving module 72 is specifically configured to receive the identifiers of the base stations and channel frequencies used by the base stations. Correspondingly, the second determination unit 732 is configured to determine the base station having a channel frequency matched with a channel frequency supported by the terminal as the target base station.

The service information sending module 71 may be configured to send a message to the target base station, in which the message contains the information of the service required by the terminal.

In this embodiment, when a FAP currently connected to the terminal does not support the service required by the terminal, the terminal can receive the information acquired by the FAP about the base stations supporting the service required by the terminal, so that the terminal can correctly select the target base station supporting the service required by the terminal and the blindness in selection of the target base station is reduced, thereby increasing the efficiency of implementing the required service by the terminal. In this embodiment, the work mechanism of the terminal may be referred to the description in Embodiment 2, Embodiment 4, and Embodiment 5, and therefore is not described here again.

Embodiment 13

Figure 8:
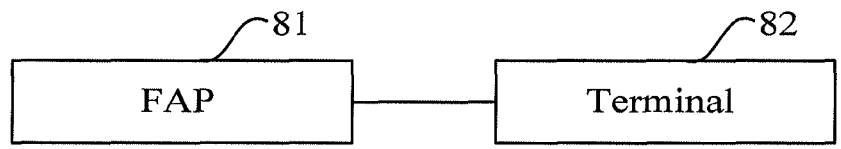
FIG. 8 is a schematic structural view of a communication system according to Embodiment 13 of the present invention.

FIG. 8 is a schematic structural view of a communication system according to a thirteenth embodiment of the present invention. As shown in FIG. 8, in this embodiment, the communication system includes a FAP 81 and a terminal 82 in communication connection with each other.

The FAP 81 is configured to receive a message, in which the message contains information of a service required by the terminal, acquire information of base stations supporting the service when the FAP determines that it does not support the service, send the information of the base stations supporting the service to the terminal, so as to enable the terminal to determine a target base station according to the information of the base stations supporting the service, and send the message to the target base station.

The terminal 82 is configured to send a message to the FAP, in which the message contains the information of the service required by the terminal, receive the information of the base stations supporting the service sent from the FAP, in which the information of the base stations supporting the service is acquired when the FAP determines that it does not support the service, determine the target base station according to the information of the base stations supporting the service, and send the message to the target base station.

In this embodiment, when a FAP currently connected to the terminal does not support the service required by the terminal, the FAP acquires the information of the base stations supporting the service required by the terminal, and sends the information of the base stations supporting the service to the terminal, so that the terminal can correctly select the target base station supporting the service required by the terminal, thereby redirecting the terminal to the target base station supporting the service required by the terminal, and increasing the efficiency of implementing the required service by the terminal. In this embodiment, the detailed functional structure of the FAP may be referred to the description in the embodiment corresponding FIG. 6, and the work mechanism of the FAP may be referred to the description in the embodiments corresponding to FIGS. 1, 4, and 5, which are not described here again. In this embodiment, the detailed functional structure of the terminal may be referred to the description in the embodiment corresponding to FIG. 7, and the work mechanism of the terminal may be referred to the description in the embodiments corresponding to FIGS. 2, 4, and 5, which are not described here again.

Embodiment 14

Figure 9:
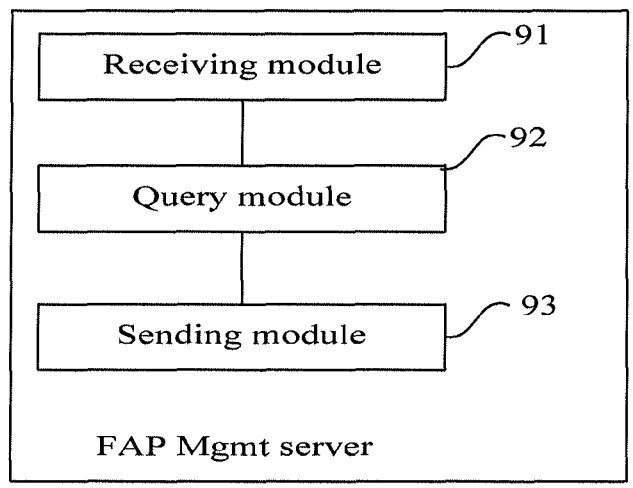
FIG. 9 is a schematic structural view of a FAP management server according to Embodiment 14 of the present invention.

FIG. 9 is a schematic structural view of a FAP management server according to a fourteenth embodiment of the present invention. As shown in FIG. 9, in this embodiment, the FAP management server includes a receiving module 91, a query module 92, and a sending module 93.

The receiving module 91 is configured to receive a request for querying information of base stations supporting a service sent from a FAP.

The query module 92 is configured to query the information of base stations stored in the query module 92, and acquire information of base stations adjacent to the FAP sending the query request.

The sending module 93 is configured to send the information of the adjacent base stations to the FAP sending the query request.

In this embodiment, the FAP may acquire the information of the base stations adjacent to the FAP from the FAP management server, so that the FAP can redirect a terminal to a target base station supporting a service required by the terminal when the FAP does not support the service required by the terminal, thereby increasing the efficiency of implementing the required service by the terminal. In this embodiment, the work mechanism of the FAP management server may be referred to the description in the embodiments corresponding to FIGS. 4 and 5, and is not described here again.

Embodiment 15

Figure 10:
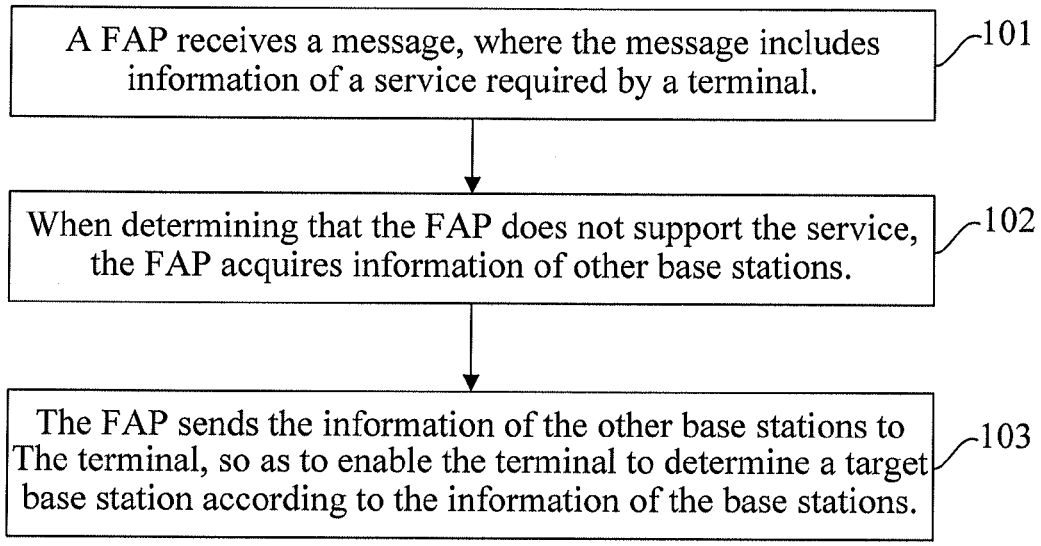
FIG. 10 is a flow chart of a redirection method according to Embodiment 15 of the present invention.

FIG. 10 is a flow chart of a redirection method according to Embodiment 15 of the present invention. An execution body of this embodiment may be a femto base station (Femto Access Point, FAP for short) currently connected to a terminal. As shown in FIG. 10, the redirection method of this embodiment includes the following steps.

Step 101: A FAP receives a message, where the message includes information of a service required by a terminal.

If the terminal needs to access a network, the FAP may provide a network access service. When the terminal initiates a connection with a certain FAP, the terminal sends a message to the FAP, where the message includes information of a service required by the terminal. The information of the service required by the terminal may include indication information of an emergency service required by the terminal or a location update service or a re-entry service required by the terminal.

Step 102: When determining that the FAP does not support the service, the FAP acquires information of other base stations.

The FAP judges whether the FAP supports the service according to the information of the service required by the terminal. If the FAP supports the service, the FAP provides a network access service of the service for the terminal; and if the FAP does not support the service, the FAP acquires the information of the other base stations. The information of the other base stations at least includes identifier of base stations and indication information for indicating whether a corresponding base station supports the service, and further includes channel frequencies used by base stations. The other base stations may include a Macro Base Station (MBS) adjacent to the FAP and/or a FAP adjacent to the PAP.

The manner of acquiring the information of the other base stations is not limited. For example, the FAP may acquire the information of the other base stations from a FAP management server; alternatively, during network deployment, the information of the other base stations is pre-configured on the FAP.

Step 103: The FAP sends the information of the other base stations to the terminal, so as to enable the terminal to determine a target base station according to the information of the base stations.

The FAP sends the information of the other base stations to the terminal. The terminal may first select one or more base stations supporting the service according to the indication information for indicating whether the service is supported included in the received information of the base stations, and further determine the target base station. A strategy for further selecting the target base station may be flexibly set according to actual requirements. For example, the terminal may select a base station with the highest signal intensity as the target base station according to the signal strength. Alternatively, the terminal may select a base station with a channel frequency matched with a channel frequency supported by the terminal as the target base station.

In this embodiment, when the FAP with which the terminal initiates a connection does not support the service required by the terminal, the FAP acquires the information of the other base stations and sends the information of the base stations to the terminal, so that the terminal can correctly select the target base station supporting the service required by the terminal. Therefore, the terminal is redirected to the target base station supporting the service required by the terminal, thereby increasing efficiency of implementing the required service by the terminal.

Embodiment 16

Figure 11:
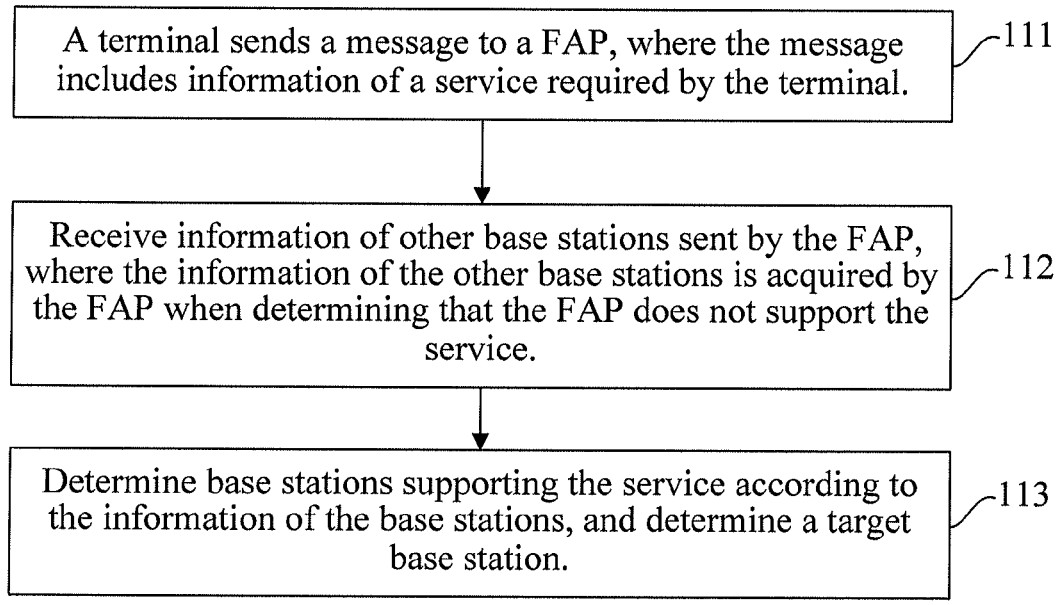
FIG. 11 is a flow chart of a redirection method according to Embodiment 16 of the present invention.

FIG. 11 is a flow chart of a redirection method according to Embodiment 16 of the present invention. An execution body of this embodiment may be a terminal. As shown in FIG. 11, the redirection method of this embodiment includes the following steps.

Step 111: A terminal sends a message to a FAP, where the message includes information of a service required by the terminal.

The terminal sends the information of the service required by the terminal to a currently selected FAP to request the FAP to provide a network access service for the terminal. The information of the service required by the terminal may include indication information of an emergency service required by the terminal or indication information of a location update service or a re-entry service required by the terminal.

Step 112: Receive information of other base stations sent by the FAP, where the information of the other base stations is acquired by the FAP when determining that the FAP does not support the service, and the information of the base station at least includes an identifier of a base station and indication information for indicating whether a corresponding base station supports the service.

When receiving the information of the service required by the terminal, the FAP judges whether the FAP supports the service. If the FAP supports the service, the FAP provides the network access service for the terminal; and if the FAP does not support the service, the FAP acquires the information of the other base stations, and sends the information of the other base stations to the terminal. The information of the other base stations at least includes identifier of base station and indication information for indicating whether a corresponding base station supports the service, and further includes channel frequencies used by base station. The other base stations may include MBS adjacent to the FAP and/or neighbor FAP adjacent to the FAP.

Step 113: The terminal determines base stations supporting the service according to the indication information, for indicating whether the service is supported, included in the received information of the other base stations, and further determines a target base station.

The terminal may first select one or more base stations supporting the service according to the indication information for indicating whether the service is supported, included in the received information of the base stations, and further determine the target base station. A strategy for further selecting the target base station may be flexibly set according to actual requirements. For example, the terminal may select a base station with the highest signal intensity as the target base station according to the signal strength. Alternatively, the terminal may select a base station with a channel frequency matched with a channel frequency supported by the terminal as the target base station.

After the target base station is determined, the terminal sends the message to the target base station, where the message includes the information of the service required by the terminal. The target base station provides the network access service for the terminal, so that the terminal implements the required service.

In this embodiment, when the FAP currently connected to the terminal does not support the service required by the terminal, the terminal may receive the information of the other base stations acquired by the FAP, and the information of the other base stations at least includes an identifier of a base station and indication information for indicating whether a corresponding base station supports the service, so that the terminal can correctly select the target base station supporting the service required by the terminal. Therefore, the blindness in selection of the target base station is reduced, and accordingly, the efficiency of implementing the required service by the terminal is increased.

Embodiment 17

Figure 12:
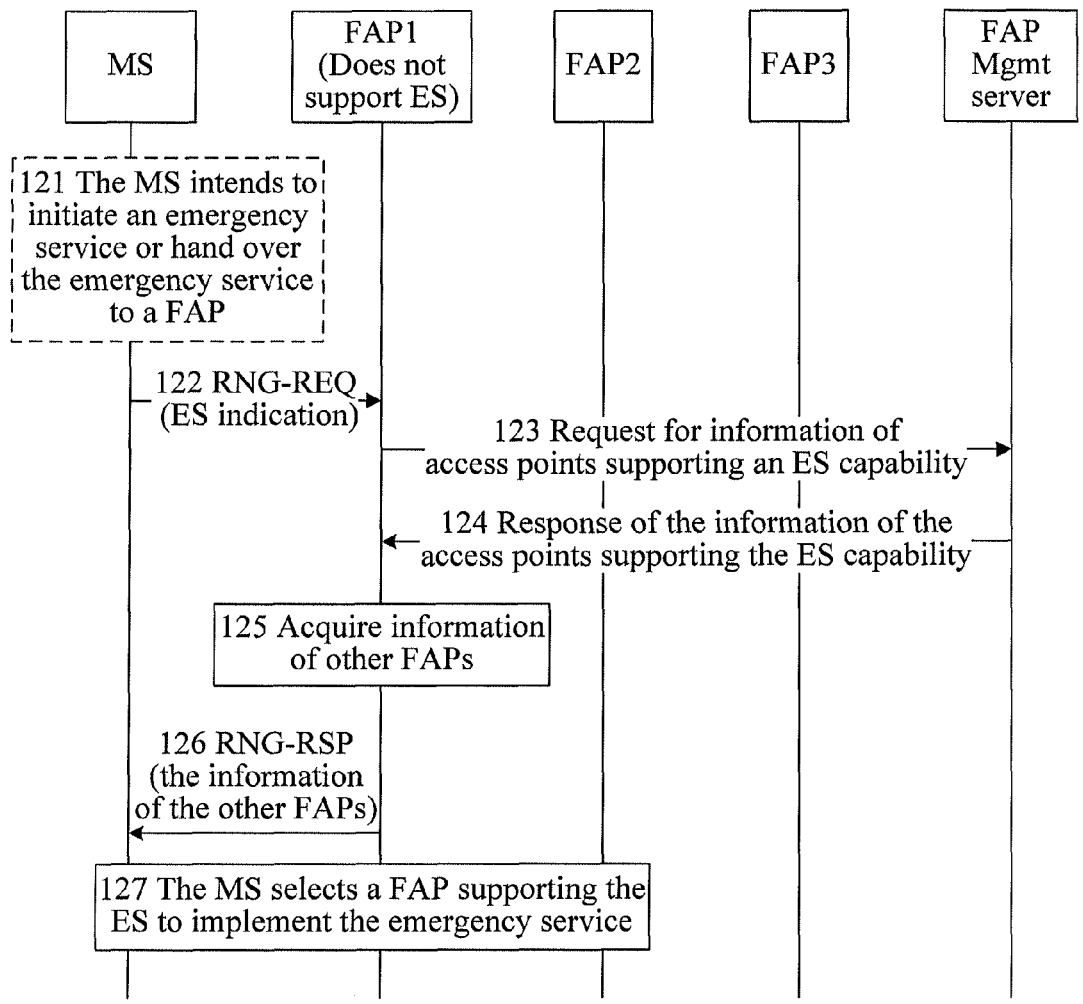
FIG. 12 is a diagram of signaling interaction in a redirection method according to Embodiment 17 of the present invention.

FIG. 12 is a diagram of signaling interaction in a redirection method according to Embodiment 17 of the present invention. This embodiment is described by taking emergency service processing in an application scenario as an example. It is assumed in this embodiment that, a service required by an MS is an emergency service, a FAP currently connected to the MS is a FAP1, a FAP2 and a FAP3 are FAPs adjacent to the FAP1, and a FAP management server manages the FAP and can enable or disable an emergency service support capability of the FAP. As shown in FIG. 12, the redirection method of this embodiment includes the following steps.

Step 121: When an MS intends to initiate an emergency service or the MS intends to hand over the emergency service from an original cell to a cell covered by a FAP, the MS selects a serving FAP, for example, the FAP1. In this case, the MS does not know whether the FAP1 supports the emergency service.

If the MS intends to initiate an emergency service, for example, an emergency call service through the selected serving FAP when switched on and powered up, or an MS carrying out the emergency service needs to be handed over to the FAP, the MS selects a FAP according to a preset base station selection strategy, where the selected FAP is the FAP1. In this case, the MS cannot determine whether the FAP1 supports the emergency service.

Step 122: The MS sends a ranging request (RNG-REQ) message to the FAP1, where the RNG-REQ message carries emergency service indication information.

Step 123: The FAP1 sends a query request for information of access points supporting an ES capability to the FAP management server, for querying information of the emergency service support capability of adjacent FAPs.

The FAP1 receives the RNG-REQ message sent by the MS. Since the RNG-REQ message carries the emergency service indication information, the FAP1 learns that the service required by the MS is an emergency service.

The FAP1 judges whether the FAP1 supports the emergency service. If the FAP1 supports the emergency service, the FAP1 provides a network access service for the MS, and sends a ranging response (RNG-RSP) message to the MS, where the RNG-RSP message carries indication information of accepting MS access.

If the FAP1 does not have the emergency service support capability, the FAP1 currently does not support the emergency service; alternatively, although the FAP1 has the emergency service support capability, under the control of the FAP management server, the emergency service support capability of the FAP1 is already disabled, that is, an indication identifier of supporting the emergency service in the FAP1 is set to a value corresponding to not supporting the emergency service, and the FAP1 does not support the emergency service. After determining that the FAP1 does not support the emergency service, the FAP1 needs to acquire information of other base stations.

The FAP1 may send the query request for information of the access points supporting the ES capability to the FAP management server, for querying information of the emergency service support capability of adjacent FAPs.

The FAP management server maintains information of FAPs. The information of the FAPs includes identifiers of the FAPs and information of the ES support capability of the FAPs. The information of the FAPs may further include one or more pieces of the following information: channel frequencies, power, and location of the FAPs, lists of terminal identifiers contained in a CSG, and identifiers of paging groups which the FAPs belong to.

Optionally, the FAP management server may further maintain the information of a MBS. In this case, the FAP1 may acquire information of a MBS adjacent to the FAP1 from the FAP management server. The situation is not shown in FIG. 12.

Step 124: The FAP management server determines adjacent FAPs of the FAP1, and sends a response message of the information of the access points supporting the ES capability to the FAP1, where the response message of the information of the access points supporting the ES capability carries information of other FAPs, and the information of the other FAPs at least includes identifier of FAPs and indication information for indicating whether a corresponding base station supports the emergency service. Optionally, the information of the adjacent FAPs may further include information such as channel frequencies of the FAPs.

The other base station may be a MBS adjacent to the FAP, and/or a FAP adjacent to the FAP. It is assumed in this embodiment that adjacent FAPs of the FAP1 include a FAP2 and a FAP3, and the FAP management server sends information of the FAP2 and the FAP3 to the FAP1. The information sent to the FAP1 by the FAP management server includes an identifier of the FAP2, indication information of the FAP2 supporting an emergency service, an identifier of the FAP3, and indication information of the FAP3 not supporting an emergency service. Optionally, the information sent to the FAP1 by the FAP management server may further include information such as a channel frequency of the FAP2 and a channel frequency of the FAP3.

Optionally, if the FAP management server maintains information of a MBS, the FAP management server sends information of a MBS adjacent to the FAP1 to the FAP1.

Step 125: The FAP1 receives the response message of the information of the access points supporting the ES capability, and acquires the information of the adjacent FAPs from the message.

Step 126: The FAP1 sends an RNG-RSP message to the MS, where the RNG-RSP message carries identifiers of the FAP2 and FAP3, the indication information of the FAP2 supporting the emergency service, and the indication information of the FAP3 not supporting the emergency service. Optionally, the RNG-RSP message may further carry channel frequencies used by the FAP2 and the FAP3 supporting the emergency service.

Optionally, the FAP1 sends an identifier of an adjacent MBS to the MS. Optionally, the FAP1 sends a channel frequency used by the MBS to the MS. The identifier of the MBS and the channel frequency used by the MBS may be carried in the RNG-RSP message and sent to the MS.

Step 127: The MS determines base stations supporting the emergency service according to the received information of the base stations to determine a target base station, and sends the emergency service indication information to the target base station. The target base station provides a network access service for the MS, so that the MS implements the emergency service through the target base station. FIG. 12 schematically shows a situation where the MS determines the FAP2 as the target base station.

The MS receives the information of the base stations sent from the FAP1. The terminal may first select one or more base stations supporting the service according to the indication information, for indicating whether the service is supported, included in the received information of the base stations, and further determine the target base station. A strategy for further selecting the target base station may be flexibly set according to actual requirements. For example, the terminal may select a base station with the highest signal intensity as the target base station according to the signal strength. Alternatively, the terminal may select a base station with a channel frequency matched with a channel frequency supported by the terminal as the target base station. The target base station is determined by using a preset base station selection strategy. In this embodiment, the MS first determines that the FAP2 supports the emergency service. Since only one base station supports the emergency service, the FAP2 is determined as the target base station.

In this embodiment, when the FAP currently connected to the MS does not support the emergency service, the FAP acquires the information of the other base stations from the FAP management server, sends the information of the other base stations to the MS, and guides the MS to the base station supporting the emergency service. Therefore, the blindness in selection of the target base station by the MS is reduced, and accordingly, the efficiency of implementing the emergency service by the MS is increased.

Embodiment 18

This embodiment is another embodiment of a redirection method of the present invention. The difference between this embodiment and Embodiment 17 is that, in this embodiment, in a deployment process of a WiMAX FAP, information of other FAPs than the FAP itself may be pre-configured on the deployed FAP. The information of the FAPs includes identifiers of the FAPs and indication information for indicating whether the FAP supports an emergency service. The information of the FAPs may further include one or more pieces of the following information: channel frequencies, power, and location of the FAP, lists of terminal identifiers contained in a CSG, and identifier of paging groups which the FAPs belong to.

In this embodiment, step 123 and step 124 do not need to be performed, and step 125 is specifically as follows. The FAP1 acquires the information of the other FAPs according to pre-configuration. Other processing processes are similar to those in Embodiment 17 and will not be described here again.

In this embodiment, if the emergency service support capability of other FAPs is changed, for example, in a case that a FAP3 supports an emergency service during network deployment, but in a subsequent application process, the FAP management server disables the emergency service support capability of the FAP3, so that the emergency service support capability of the FAP3 is changed, and the FAP1 may update pre-deployed information of adjacent FAPs. The manner of updating the information of the adjacent FAPs is not limited. For example, a network administrator manually updates the information of the adjacent FAPs on the FAP1. Alternatively, the FAP with the emergency service support capability being changed actively notifies the adjacent FAPs, so that the adjacent FAPs can update information configured on the adjacent FAPs.

In this embodiment, when the FAP currently connected to the MS does not support the emergency service, the FAP sends the pre-configured information of the other FAPs to the MS, and guides the MS to the FAP supporting the emergency service, so that the MS can correctly select a target base station supporting the emergency service. Therefore, the blindness in selection of the target base station in a redirection process is reduced, and accordingly, the efficiency of implementing the emergency service by the MS is increased.

Embodiment 19

This embodiment is another embodiment of a redirection method of the present invention. The difference between this embodiment and Embodiment 17 is that, in this embodiment, the FAP1 may acquire information of an MBS adjacent to the FAP1. In this case, the following is included.

In step 126, the REQ-RSP message sent to the MS further carries acquired information of the MBS. Other processing processes are similar to those in Embodiment 17 and will not be described here again.

The manner of acquiring the MBS by the FAP1 is not limited.

For example, the FAP1 may acquire information of the MBS deployed in periphery of the FAP1 through actively scanning, and the following steps are specifically included. The FAP1 broadcasts a scan request. A MBS that receives the scan request feeds back a scan response to the FAP1. The FAP1 acquires information of the corresponding MBS according to the scan response.

Alternatively, the FAP1 may determine the MBS deployed in periphery of the FAP1 through a cell broadcast message received by the FAP1. If the FAP1 is in the coverage of the MBS, the FAP can receive the cell broadcast message sent by the MBS, thereby acquiring information of the corresponding MBS.

Alternatively, a FAP management server maintains the information of the MBS, and the FAP management server may send the information of the MBS adjacent to the FAP1 to the FAP1.

In this embodiment, when the FAP currently connected to the MS does not support the emergency service, the FAP may acquire the information of the MBS deployed in periphery of the FAP, sends the acquired information of the MBS to the MS, and guides the MS to the MBS, so that the MS can correctly select a target base station supporting the emergency service. Therefore, the blindness in selection of the target base station in a redirection process is reduced, and accordingly, the efficiency of implementing the emergency service by the MS is increased.

Embodiment 20

Figure 13:
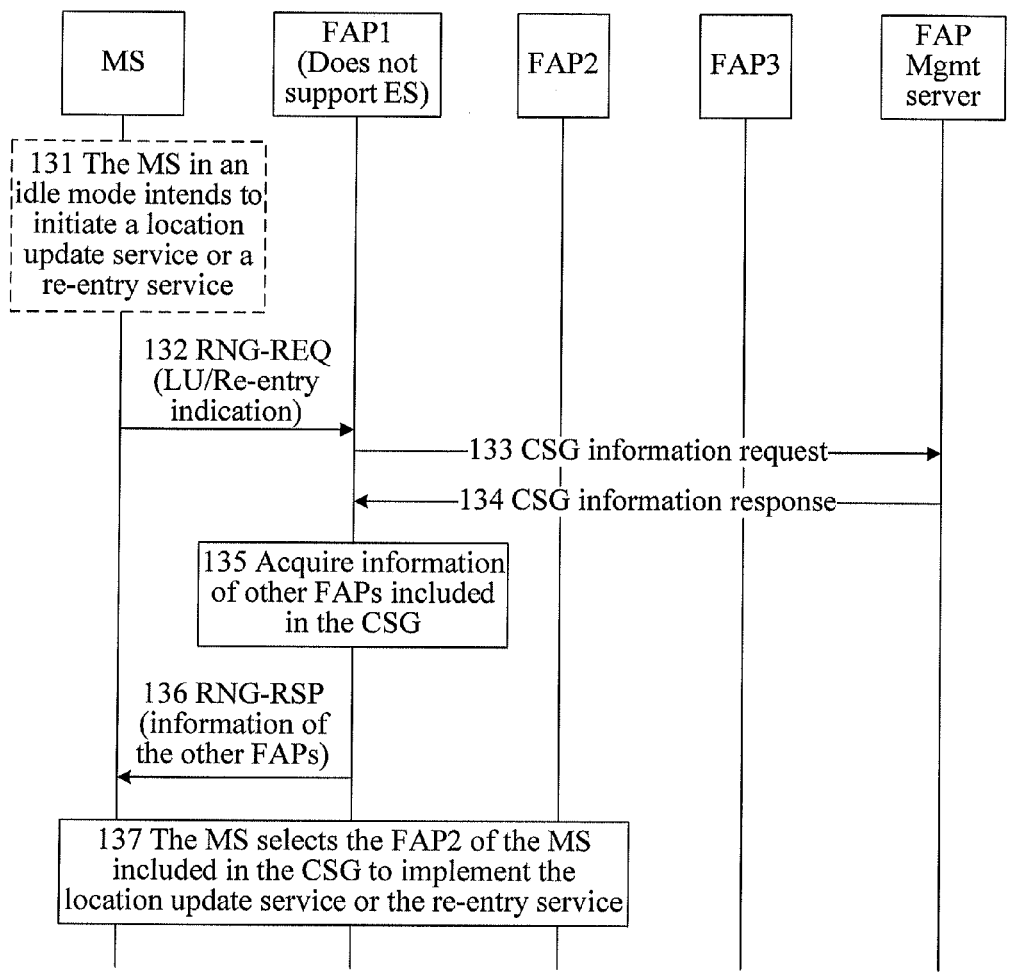
FIG. 13 is a diagram of signaling interaction in a redirection method according to Embodiment 20 of the present invention.

FIG. 13 is a diagram of signaling interaction in a redirection method according to Embodiment 20 of the present invention. This embodiment is described by taking a processing process of a non-emergency service initiated by a terminal in an idle mode as an example.

In this embodiment, it is assumed that an MS is in an idle (Idle) mode, and a service required by the MS is a location update (Location Update, LU) service or a re-entry (Re-entry) service, where both the location update service and the re-entry service are non-emergency services. A FAP currently connected to the MS is a FAP1 of a CSG type, a FAP2 and a FAP3 are FAPs separately adjacent to the FAP1, and a FAP management server manages the FAPs and maintains information of the FAPs. As shown in FIG. 13, the redirection method of this embodiment includes the following steps.

Step 131: When the MS is in an idle mode and needs to initiate a location update service or a re-entry service, the MS selects a serving FAP, for example, a FAP1. In this case, the MS does not know whether the MS belongs to a subscriber group of the FAP1.

The idle mode is a power saving mode provided for a terminal in a WiMAX specification. A terminal in the power saving mode needs to regularly receive information from a base station, and needs to update its own location information on a paging controller when the terminal finds that a paging group of an area where the terminal is located is changed, that is, initiate a location update service. Alternatively, the terminal needs to select an access point to exit the idle mode when finding data transmission, that is, initiate a re-entry service.

A CSG FAP can increase a control function for a user, where the function may be achieved by managing CSG information on the CSG FAP. As for a non-emergency service, for example, a location update service or a re-entry service, generally only a terminal belonging to a CSG can access a network through the FAP. Therefore, the CSG FAP needs to judge whether a visitor terminal belongs to its own subscriber group, so as to determine whether to provide a network access service for the visitor terminal.

However, as for an Open FAP and an OSG FAP, generally, the network access service can be provided for all visitor terminals.

In this embodiment, when the MS in an idle mode initiates a non-emergency service, for example, a location update service or a re-entry service, the MS does not know whether the MS belongs to a subscriber group of a FAP of an area where the MS is located, so the MS may select a FAP of a subscriber group that the MS does not belong to, and initiate the location update service or the re-entry service to the selected FAP.

Step 132: The MS sends a ranging request (RNG-REQ) message to the FAP1, where the RNG-REQ message carries indication information of the non-emergency service and identifier information of the MS. The identifier information of the MS includes information such as an equipment identifier and an MAC address of the MS.

If the non-emergency service initiated by the MS is a location update service, the indication information of the non-emergency service is indication information of the location update. If the non-emergency service initiated by the MS is a re-entry service, the indication information of the non-emergency service is indication information of exiting the idle mode.

Step 133: The FAP1 sends an MS CSG information request message to the FAP management server for requesting querying CSG information of adjacent FAPs, where the adjacent FAPs of the FAP1 is FAPs deployed in periphery of the FAP1.

The FAP1 receives the RNG-REQ message sent from the MS, and learns that the service required by the MS is a non-emergency service, for example, a location update service or a re-entry service, since the RNG-REQ message carries the indication information of the non-emergency service.

It is assumed in this embodiment that the FAP1 is a CSG FAP. The FAP1 determines whether the MS belongs to a subscriber group of the FAP1 according to the identifier information of the MS. For example, the FAP1 determines whether the identifier information of the MS such as the equipment identifier or MAC address of the MS is in a list of terminal information of the subscriber group. If the identifier information of the MS is in the list of the terminal information of the subscriber group, the MS belongs to the subscriber group of the FAP1; while if the identifier information of the MS is not in the list of the terminal information of the subscriber group, the MS does not belong to the subscriber group of the FAP1.

If the MS belongs to the subscriber group of the FAP1, the FAP1 provides a network access service for the MS, and sends a ranging response (RNG-RSP) message to the MS, where the RNG-RSP message carries indication information of accepting MS access.

If the MS does not belong to the subscriber group of the FAP1, the FAP1 refuses to provide the network access service for the MS, and acquires information of other base stations capable of providing the network access service for the MS.

The FAP management server maintains information of FAPs. The information of the FAPs include identifier of the FAPs. The FAPs may include an Open FAP, an OSG FAP, and a CSG FAP. As for the CSG FAP, the FAP management server further maintains CSG information of the CSG FAP, where the CSG information may be a list of terminal identifiers contained in a CSG. The information of the FAPs may further include one or more pieces of the following information: channel frequencies, power, and locations of the FAPs, information of an emergency service support capability of the FAPs, and identifiers of paging groups which the FAPs belong to.

Optionally, the FAP management server may further maintain information of a MBS. In this case, the FAP1 may acquire information of a MBS adjacent to the FAP1 from the FAP management server, as shown in FIG. 13.

Step 134: The FAP management server determines adjacent FAPs of the FAP1, and sends an MS CSG information response message to the FAP1, where the MS CSG information response message carries the information of the adjacent FAPs. The information of the adjacent FAPs include identifiers of the FAPs, and may further include CSG information of the CSG FAP if the FAP is the CSG FAP, where the CSG information may be a list of terminal identifiers contained in a CSG Optionally, the information of the adjacent FAPs may further include information such as channel frequencies used by the FAPs.

The other base station may be a MBS adjacent to the FAP, and/or a FAP adjacent to the FAP. It is assumed in this embodiment that, the adjacent FAP of the FAP1 includes the FAP2 and the FAP3, and the FAP management server sends the information of the FAP2 and the FAP3 to the FAP1. The information sent to the FAP1 by the FAP management server includes an identifier of the FAP2 and an identifier of the FAP3. If both the FAP2 and the FAP3 are CSG FAPs, the information sent to the FAP1 by the FAP management server further includes CSG information of the FAP2 and CSG information of the FAP3. Optionally, the information sent to the FAP1 by the FAP management server may further include information such as a channel frequency of the FAP2 and a channel frequency of the FAP3.

Optionally, if the FAP management server maintains information of a MBS, the FAP management server sends information of a MBS adjacent to the FAP1 to the FAP1.

It is assumed in this embodiment that both the FAP2 and the FAP3 are CSG FAPs.

Step 135: The FAP1 receives the MS CSG information response message, and acquires the information of the adjacent FAPs from the message.

Optionally, if the information of the base stations acquired by the FAP1 from the FAP management server further include the information of the MBS adjacent to the FAP1, the Open FAPs adjacent to the FAP1, and/or the OSG FAPs adjacent to the FAP1, the FAP1 sends the information of the base stations to the MS.

Step 136: The FAP1 sends an RNG-RSP message to the MS, where the RNG-RSP message carries the information of the other base stations, for example, identifiers of the FAP2 and the FAP3 supporting the location update service or the re-entry service of the MS, and indication information for indicating that the FAP2 and the FAP3 support the location update service or the re-entry service. Optionally, the RNG-RSP message may further carry a channel frequency used by the FAP2 and/or the FAP3 supporting the location update service or the re-entry service of the MS.

Step 137: The MS determines base stations supporting the service according to the information of the other base stations and determines a target base station, and sends the indication information of the location update service or the re-entry service to the target base station. The target base station provides a network access service for the MS, so that the MS may implement the location update service or the re-entry service through the target base station.

The MS receives the information of the other base stations sent by the FAP1, and determines FAPs including MS identifier information in the CSG information according to the CSG information of the adjacent FAPs, where the FAPs support the location update service or re-entry service of the MS.

After selecting the base stations supporting the service, the MS determines the target base station in the base stations supporting the service by using a preset base station selection strategy. The manner of the MS determining the target base station is not limited. For details, reference may be made to the corresponding description in step 127 in Embodiment 17, and the details will not be described here again. FIG. 13 shows a situation where the MS selects the FAP2 as the target base station.

In this embodiment, when the MS does not belong to the subscriber group of the currently connected FAP, the FAP acquires the information of the other base stations from the FAP management server, sends the information of the other base stations to the MS, and guides the MS to the base station supporting the location update service or the re-entry service of the terminal, so as to reduce the blindness in selection of the target base station from the base stations, thereby increasing the efficiency of implementing the location update service or the re-entry service by the MS in an idle mode.

Furthermore, depending on different manners that the FAP1 acquires the information of the base station supporting the non-emergency service, a part of the technical features of the technical solution according to this embodiment may be replaced to obtain some variations of the embodiment of the present invention.

Embodiment 21

This embodiment is yet another embodiment of a redirection method of the present invention. The difference between this embodiment and Embodiment 20 is that, in this embodiment, in a deployment process of a WiMAX FAP, information of adjacent FAPs may be pre-configured on the deployed FAP. The information of the adjacent FAPs includes a type of the FAP and an identifier of the FAP. If the FAP is a CSG FAP, the information of the adjacent FAP further includes CSG information of the CSG FAP, where the CSG information may be a list of terminal identifiers contained in a CSG. The information of the FAPs may further include one or more pieces of the following information: channel frequencies, power, and locations used by the FAPs, information of an emergency service support capability of the FAPs, and identifiers of paging groups which the FAPs belong to.

In this embodiment, a FAP1 does not need to query information of base stations supporting a non-emergency service of an MS from a FAP management server, that is, steps 133 and 134 do not need to be performed, and step 135 is specifically that the FAP1 acquires information of other base stations according to pre-configuration. Other processing processes are similar to those in Embodiment 20 and will not be described here again.

In this embodiment, if the CSG of a CSG FAP among the adjacent FAPs is changed, the FAP1 may update pre-deployed information of the adjacent FAPs. The manner of updating the information of the CSG FAP is not limited. For example, a network administrator manually updates the information of the CSG FAP on the FAP1. Alternatively, the FAP with the CSG being changed may actively notify the adjacent FAPs, so that the adjacent FAPs can update information configured on the adjacent FAP.

In this embodiment, when the MS does not belong to a subscriber group of a currently connected FAP, the FAP pre-configures information of the other base stations, sends the information of the other base stations to the MS, and guides the MS to a target base station supporting the location update service or the re-entry service of the MS, so that the blindness in selection of the target base station by the MS is reduced, thereby increasing efficiency of implementing the location update service or the re-entry service by the MS in an idle mode.

Embodiment 22

This embodiment is yet another embodiment of a redirection method of the present invention. The difference between this embodiment and Embodiment 20 is that, in this embodiment, the FAP1 acquires information of an MBS adjacent to the FAP1. In this case, in step 136, an REQ-RSP message sent to an MS further carries acquired information of an MBS. Other processing processes are similar to those in Embodiment 20 and will not be described here again.

The manner of the FAP1 acquiring the information of the MBS is not limited. For details, reference may be made to the corresponding description in Embodiment 6, and the details will not be described here again.

In this embodiment, when the MS does not belong to a subscriber group of a currently connected FAP, the FAP may acquire information of an MBS deployed in periphery of the FAP, send the acquired information of the MBS to the MS, and guide the MS to the MBS, thereby increasing the efficiency of implementing the location update service or the re-entry service by the MS in an idle mode.

Embodiment 23

Figure 14:
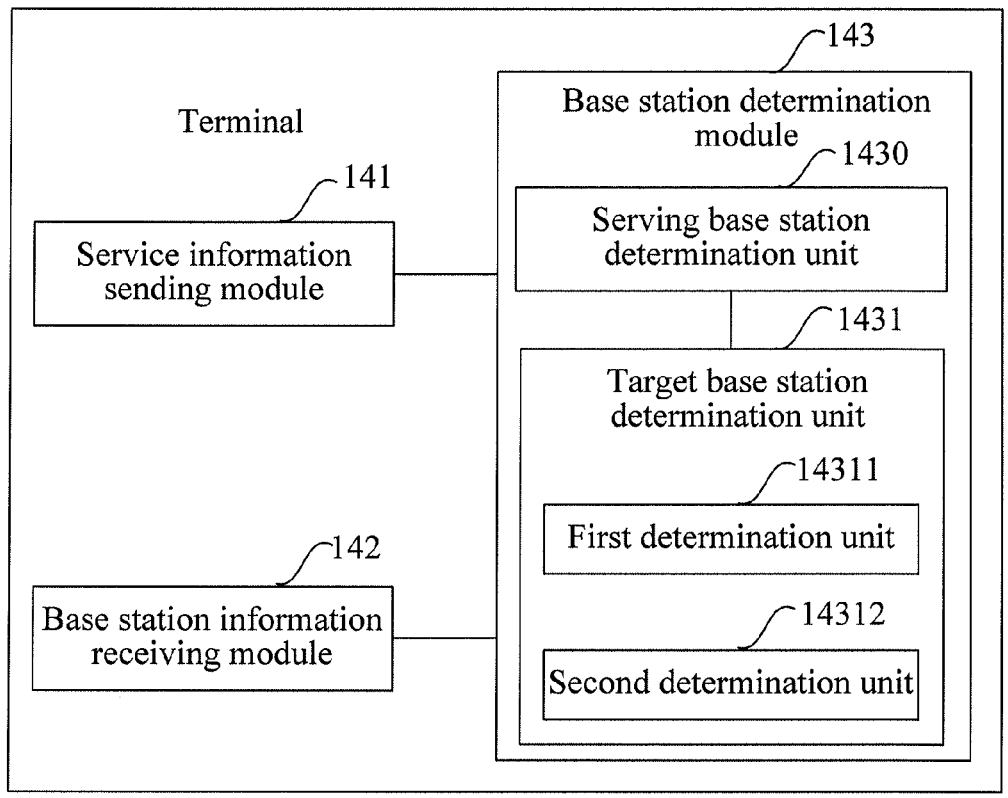
FIG. 14 is a schematic structural diagram of a terminal according to Embodiment 23 of the present invention.

FIG. 14 is a schematic structural diagram of a terminal according to Embodiment 23 of the present invention. As shown in FIG. 14, the terminal of this embodiment includes a service information sending module 141, a base station information receiving module 142, and a base station determination module 143.

The service information sending module 141 is configured to send a message to a FAP, where the message includes information of a service required by the terminal.

The base station information receiving module 142 is configured to receive information of other base stations sent by the FAP, where the information of the other base stations is acquired by the FAP when determining that the FAP does not support the service.

The base station determination module 143 is configured to determine base stations supporting the service according to the information of the base stations and determine a target base station in the base stations supporting the service.

Furthermore, the information of the other base stations received by the base station information receiving module includes identifier of base stations and indication information for indicating whether corresponding base stations support the service. Optionally, the information of the other base stations may further include channel frequencies used by base stations. The base station determination module 143 is configured to determine base stations supporting the service according to the indication information for indicating whether corresponding base stations supports the service and determine a target base station in the base stations supporting the service.

In the foregoing technical solution, optionally, the service required by the terminal may include an emergency service, a location update service, or a re-entry service.

On the basis of the foregoing technical solution, the base station determination module 143 includes a serving base station determination unit 1430 and a target base station determination unit 1431.

The base station information receiving module specifically receives the identifiers of the base stations and the indication information for indicating whether the corresponding base stations support the service. The serving base station determination unit 1430 is configured to determine the base stations supporting the service according to the indication information for indicating whether the corresponding base station supports the service. The target base station determination unit 1431 is configured to determine the target base station in the base stations supporting the service.

The target base station determination unit includes a first determination unit 14311 or a second determination unit 14312.

The first determination unit 14311 is configured to determine the target base station according to signal strength of the base stations supporting the service.

Alternatively, the base station information receiving module 142 specifically receives channel frequencies used by the base stations. Accordingly, the second determination unit 14312 is configured to determine a base station with a channel frequency matched with a channel frequency supported by the terminal as the target base station.

The service information sending module 141 is configured to send the message to the target base station, where the message includes the information of the service required by the terminal.

In this embodiment, when the FAP currently connected to the terminal does not support the service required by the terminal, the terminal may receive the information of the other base stations acquired by the FAP, so that the terminal can correctly select the target base station supporting the service required by the terminal, thereby decreasing the blindness in selection of the target base station, and increasing efficiency of implementing the required service by the terminal.

Embodiment 24

Figure 15:
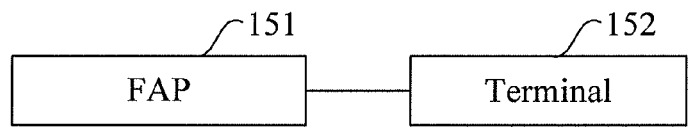
FIG. 15 is a schematic structural diagram of a communication system according to Embodiment 24 of the present invention.

FIG. 15 is a schematic structural diagram of a communication system according to Embodiment 24 of the present invention. As shown in FIG. 15, the communication system of this embodiment includes a FAP 151 and a terminal 152, where the FAP 151 is in communication connection with the terminal 152.

The FAP 151 is configured to: receive a message, where the message includes information of a service required by the terminal; acquire information of other base stations when the FAP determines that the FAP does not support the service; and send the information of the base stations to the terminal, so as to enable the terminal to determine a target base station according to the information of the base stations and send the message to the target base station.

The terminal 152 is configured to: send the message to the FAP, where the message includes the information of the service required by the terminal; receive the information of the other base stations sent by the FAP, where the information of the other base stations is acquired by the FAP when determining that the FAP does not support the service, and the information of the other base stations at least includes an identifier of a base station and indication information for indicating whether a corresponding base station supports the service; and determine base stations supporting the service according to the information of the base stations, determine a target base station in the base stations supporting the service, and send the message to the target base station.

In this embodiment, when the FAP currently connected to the terminal does not support the service required by the terminal, the FAP acquires the information of the other base stations and sends the information of the base stations to the terminal, so that the terminal can correctly select the target base station supporting the service required by the terminal. Therefore, the terminal is redirected to the target base station supporting the service required by the terminal, thereby increasing efficiency of implementing the required service by the terminal.

It should be understood by persons skilled in the art that the accompanying drawings are merely schematic views of an exemplary embodiment, and modules or processes in the accompanying drawings are not necessarily required during implementation of the present invention.

It should be understood by persons skilled in the art that, modules in a device according to an embodiment may be distributed in the device of the embodiment according to the description of the embodiment, or may be correspondingly changed to be disposed in one or more devices different from this embodiment. The modules in the above embodiments may be combined into one module, or may be further divided into a plurality of sub-modules.

The sequence numbers of the above embodiments of the present invention are merely for convenience of description, and do not imply quality of the embodiments.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a read-only memory (ROM), a random access memory (RAM), a magnetic disk, and an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can still be made to the technical solutions described in the embodiments, or equivalent replacements can be made to some technical features in the technical solutions, if such modifications or replacements do not depart from the spirit and scope of the present invention.

What is claimed is:

1. A redirection method, comprising:
   receiving by a femto access point (FAP), a message, wherein the message comprises information of a service required by a terminal;
   acquiring by the FAP, information of base stations supporting the service, when the FAP determines that the FAP itself does not support the service; and
   sending by the FAP, the information of the base stations supporting the service, to the terminal, wherein the terminal selects a target base station according to the information of the base stations supporting the service,
   wherein the service comprises an emergency service (ES),
   wherein the determining by the FAP, that it does not support the service, comprising: determining by the FAP, that it does not support the ES when the FAP has no ES support capability, or the ES support capability of the FAP is inactivated, and
   wherein the acquiring of the information of the base stations supporting the service comprising at least one of:
   acquiring by the FAP, the information of the base stations supporting the ES from a FAP management server,
   acquiring by the FAP, the information of base stations from the FAP management server, and determining the information of the base stations supporting the ES from the acquired information of base stations, and
   determining by the FAP, the information of the base stations supporting the ES according to locally pre-configured information of base stations.

2. The redirection method according to claim 1, wherein the base stations supporting the ES comprise at least one of:
   a Macro Base Station (MBS) adjacent to the FAP; and
   a FAP supporting the ES and adjacent to the FAP.

3. The redirection method according to claim 1, wherein the information of the base stations sent to the terminal comprises:
   identifiers of the base stations; or
   identifiers of the base stations and channel frequencies used by the base stations.

4. A femto access point (FAP), comprising:
   a service information receiving module, configured to receive a message, wherein the message comprises information of a service required by a terminal;
   a base station information acquisition module, configured to acquire information of base stations supporting the service when the FAP determines that the FAP does not support the service; and
   a base station information sending module, configured to send the information of the base stations supporting the service to the terminal, wherein the terminal selects a target base station according to the information of the base stations supporting the service,
   wherein the service information receiving module is configured to receive the message,
   wherein the message comprises information of an emergency service (ES) required by the terminal,
   wherein the base station information acquisition module comprises: a support capability determination unit, configured to determine that the FAP does not support the ES when the FAP has no ES support capability or the ES support capability of the FAP is inactivated; and a base station information acquisition unit, configured to acquire the information of the base stations supporting the ES when the support capability determination unit determines that the FAP does not support the ES, and
   wherein the base stations information acquisition unit comprises at least one of:
   a first acquisition subunit, configured to acquire the information of the base stations supporting the ES from a FAP management server;
   a second acquisition subunit, configured to acquire the information of base stations from the FAP management server, and determining the information of the base stations supporting the ES from the acquired information of base stations; and
   a third acquisition subunit, configured to determine the information of the base stations supporting the ES according to locally pre-configured information of base stations.

5. The FAP according to claim 4, wherein the base station supporting the ES comprises at least one of:
   a Macro Base Station base station (MBS) adjacent to the FAP; and
   a FAP supporting the ES and adjacent to the FAP.

6. The FAP according to claim 4, wherein
the base station information sending module is specifically configured to send identifiers of the base stations to the terminal, or send identifiers of the base stations and channel frequencies of the base stations to the terminal.

7. A communication system, comprising a femto access point (FAP) and a terminal in communication connection with the FAP, wherein
the FAP is configured to receive a message comprising information of a service required by the terminal, acquire information of base stations supporting the service when the FAP determines that the FAP does not support the service, and send the information of the base stations supporting the service to the terminal, wherein the terminal selects a target base station according to the information of the base stations supporting the service;
wherein the service comprises an emergency service (ES), wherein the determining by the FAP, that it does not support the service, comprising: determining by the FAP, that it does not support the ES when the FAP has no ES support capability, or the ES support capability of the FAP is inactivated, and
wherein the acquiring of the information of the base stations supporting the service comprising at least one of:
acquiring by the FAP, the information of the base stations supporting the ES from a FAP management server,
acquiring by the FAP, the information of base stations from the FAP management server, and determining the information of the base stations supporting the ES from the acquired information of base stations, and
determining by the FAP, the information of the base stations supporting the ES according to locally pre-configured information of base stations.

* * * * *